(12) United States Patent
Song et al.

(10) Patent No.: US 11,435,785 B2
(45) Date of Patent: Sep. 6, 2022

(54) FOLDABLE DISPLAY DEVICE

(71) Applicant: EUM.INC, Incheon (KR)

(72) Inventors: In-Sung Song, Incheon (KR);
Seung-Hee Cho, Incheon (KR)

(73) Assignee: EUM, INC., Incheon (KR)

( * ) Notice: Subject to any disclaimer, the term of this patent is extended or adjusted under 35 U.S.C. 154(b) by 133 days.

(21) Appl. No.: 16/936,699

(22) Filed: Jul. 23, 2020

(65) Prior Publication Data

US 2021/0333838 A1   Oct. 28, 2021

(30) Foreign Application Priority Data

Apr. 22, 2020 (KR) .................. 10-2020-0048888
Jun. 29, 2020 (KR) .................. 10-2020-0079562
Jun. 29, 2020 (KR) .................. 10-2020-0079563

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC ............................ G06F 1/1681; G06F 1/1652
See application file for complete search history.

(56) References Cited

U.S. PATENT DOCUMENTS

| 7,426,406 | B2 * | 9/2008 | Maatta | G06F 1/1681 |
| | | | | 16/353 |
| 8,904,601 | B2 * | 12/2014 | Hsu | H04M 1/0216 |
| | | | | 16/366 |
| 8,918,960 | B2 * | 12/2014 | Hsu | F16H 21/12 |
| | | | | 16/366 |
| 9,003,607 | B1 * | 4/2015 | Hsu | G06F 1/162 |
| | | | | 16/366 |

(Continued)

FOREIGN PATENT DOCUMENTS

| KR | 10-0909713 | 7/2009 |
| KR | 101139866 B | 5/2012 |

(Continued)

OTHER PUBLICATIONS

Korean Decision to Grant a Patent dated Feb. 23, 2021, Application No. 10-2020-0079562.

(Continued)

*Primary Examiner* — Anthony M Haughton
*Assistant Examiner* — Theron S Milliser
(74) *Attorney, Agent, or Firm* — The Dobrusin Law Firm, P.C.

(57) ABSTRACT

A foldable display device is proposed, the foldable display device including a first body and a second body formed in a plate shape to be arranged symmetrically; a display part attached to the first body and the second body to be folded or unfolded; and a hinge device coupled to the first body and the second body to connect the bodies to each other to allow (Continued)

the first body and the second body to be folded and unfolded and having first and second bracket, first and second main shafts, a rotation inducing part, and a movable part composed of first and second connection plates, wherein when the first and second bodies are folded, the first and second connection plates are in proximity to each other, and the first and second link connectors move about the first and second main shafts to be in proximity to each other.

6 Claims, 21 Drawing Sheets

(56) References Cited

U.S. PATENT DOCUMENTS

| | | | |
|---|---|---|---|
| 10,070,546 B1* | 9/2018 | Hsu | H05K 5/0017 |
| 10,394,062 B1* | 8/2019 | Song | G02F 1/133308 |
| 10,520,988 B2* | 12/2019 | Hsu | E05D 3/12 |
| 10,590,685 B2* | 3/2020 | Hsu | G06F 1/1681 |
| 10,627,867 B2* | 4/2020 | Cheng | H04M 1/02 |
| 10,754,395 B2* | 8/2020 | Sanchez | G06F 1/1658 |
| 10,782,739 B2* | 9/2020 | Ou | B60K 13/02 |
| 10,824,189 B2* | 11/2020 | Lin | H04M 1/0268 |
| 10,852,776 B1* | 12/2020 | Morrison | G06F 1/1616 |
| 11,009,919 B2* | 5/2021 | Hsu | G06F 1/1681 |
| 11,028,623 B2* | 6/2021 | Hsu | G06F 1/1652 |
| 11,028,624 B2* | 6/2021 | Hsu | G06F 1/1641 |
| 11,042,193 B2* | 6/2021 | Lin | G06F 1/1679 |
| 11,061,443 B2* | 7/2021 | Lin | H04M 1/0214 |
| 11,073,868 B2* | 7/2021 | Lin | G06F 1/1652 |
| 11,099,611 B2* | 8/2021 | Hallar | G06F 1/1616 |
| 11,108,901 B2* | 8/2021 | Lin | H04M 1/0216 |
| 11,175,695 B2* | 11/2021 | Lin | H04M 1/0216 |
| 11,224,137 B2* | 1/2022 | Hsu | H05K 5/0017 |
| 2006/0236505 A1* | 10/2006 | Maatta | H04M 1/022 16/366 |
| 2014/0251039 A1* | 9/2014 | Hsu | H04M 1/0216 74/63 |
| 2014/0251040 A1* | 9/2014 | Hsu | H04M 1/0216 74/63 |
| 2014/0251041 A1* | 9/2014 | Hsu | G06F 1/1681 74/63 |
| 2019/0040904 A1* | 2/2019 | Hsu | G06F 1/1641 |
| 2019/0112852 A1* | 4/2019 | Hsu | E05D 11/105 |
| 2019/0179373 A1* | 6/2019 | Cheng | H04M 1/02 |
| 2020/0081486 A1* | 3/2020 | Lin | G06F 1/1652 |
| 2020/0081487 A1* | 3/2020 | Lin | G06F 1/1616 |
| 2020/0081494 A1* | 3/2020 | Lin | G06F 1/1641 |
| 2020/0081495 A1* | 3/2020 | Lin | G06F 1/1679 |
| 2020/0081502 A1* | 3/2020 | Lin | G06F 1/1652 |
| 2020/0084305 A1* | 3/2020 | Lin | G06F 1/1624 |
| 2020/0133341 A1* | 4/2020 | Ou | B60K 13/02 |
| 2020/0173208 A1* | 6/2020 | Hsu | G06F 1/1641 |
| 2020/0173209 A1* | 6/2020 | Hsu | G06F 1/1681 |
| 2020/0233466 A1* | 7/2020 | Sanchez | H05K 5/0017 |
| 2020/0310497 A1* | 10/2020 | Hsu | G06F 1/1681 |
| 2020/0341509 A1* | 10/2020 | Wu | F16C 11/04 |
| 2021/0064084 A1* | 3/2021 | Lin | H04M 1/022 |
| 2021/0096608 A1* | 4/2021 | Hallar | G06F 1/1616 |
| 2021/0232183 A1* | 7/2021 | Shibayama | G06F 1/1647 |

FOREIGN PATENT DOCUMENTS

| | | |
|---|---|---|
| KR | 1020140049911 A | 4/2014 |
| KR | 1020140101295 A | 8/2014 |
| KR | 1020150099676 A | 9/2015 |
| KR | 1020150120742 A | 10/2015 |
| KR | 1020160032080 A | 3/2016 |
| KR | 1020170000309 A | 1/2017 |
| KR | 1020180010019 A | 1/2018 |
| KR | 101988966 B1 | 3/2018 |
| KR | 1020180094172 A | 8/2018 |
| KR | 1020180122210 A | 11/2018 |
| KR | 1020180125650 A | 11/2018 |
| KR | 1020190097898 A | 8/2019 |
| KR | 1020190110244 A | 9/2019 |
| KR | 1020190135159 A | 12/2019 |
| KR | 1020200037191 A | 4/2020 |

OTHER PUBLICATIONS

Korean Notification of Reason of Refusal dated Oct. 20, 2020, Application No. 10-2020-0079562.
Korean Decision to Grant a Patent dated Mar. 24, 2021, Application No. 10-2020-0079563.
Korean Notification of Reason for Refusal dated Oct. 12, 2020, Application No. 10-2020-0079563.

* cited by examiner

FOLDABLE DISPLAY DEVICE

CROSS REFERENCE TO RELATED APPLICATION

This application is based on and claims priority from Korean Patent Applications Nos. 10-2020-0048888 filed on Apr. 22, 2020, 10-2020-0079562 filed on Jun. 29, 2020 and 10-2020-0079563 filed on Jun. 29, 2020 in the Korean Intellectual Property Office, the disclosure of which is incorporated herein in its entirety by reference.

BACKGROUND OF THE INVENTION

Field of the Invention

The present disclosure relates to a foldable display device and, more particularly, to a foldable display device in which a first body and a second body of an electronic device having a folded display are rotatably connected to each other so that a rotation angle between the first and second bodies is efficiently set.

Description of the Related Art

Unless otherwise indicated herein, the descriptions set forth herein are meant to be related art to the claims of this application and, even though it is included in this section, are not to be admitted to related art.

Due to increasing industrial demand for portable electronic devices including portable terminals, portable electronic devices having various forms and functions meeting customer needs are being introduced.

General portable terminals, such as mobile phones, have a display part for displaying images, pictures, etc., and portable terminals having a function of watching TV through the display part or visually obtaining a variety of information over a wired or wireless Internet have appeared.

Furthermore, the portable terminals have been developed in various forms tailored to consumer demand and functional characteristics, and have been developed variously as a foldable type, a slidable type, a bar type, etc.

Herein, a foldable type portable terminal denotes a terminal in which two bodies are hinged together and opened in order to expand a usable area, and has continuously been developed due to its superior structural characteristics.

Particularly, in recent years, development of a thin film transistor-liquid crystal display technology and weight reduction of other components have become possible, and generally, most portable terminals have become slimmer, and their demand is increasing day by day.

However, because the external profile of portable terminals in the related art has been developed on the basis of forms more suitable for performing communication functions such as voice call, message transmission, etc., there is a disadvantage in that it may be inconvenient to use a multimedia service. For example, the display part of a general portable terminal has a vertically long shape and thus is inconvenient for viewing digital multimedia broadcasts, video files, etc.

In an effort to solve such a problem, Korean Patent No. 10-0909713 disclosed "Hinge device for mobile phone" as a registered patent of the present applicant. In order to solve the above-mentioned problem, the exemplary embodiment of the invention disclosed a hinge device for a mobile phone which is configured such that a cover of the mobile phone is rotatable by an open angle and a 360 degree angle with respect to a vertical direction while ultimately achieving structural stability of the entire device.

According to Korean Patent No. 10-0909713, there is a great advantage in that convenience of use can be enhanced and consumer demand to utilize the display part of the mobile phone in a relatively wide range can be satisfied. However, there is room for improvement, and thus it is necessary to develop a new type of hinge device and an electronic device using the same.

For example, in order to satisfy consumer demand for a large display screen even in the case of a small-size electronic device, it is necessary to provide an electronic device of a type in which a liquid crystal screen is provided on both of two bodies that are rotated together in a hinged manner, and two individual liquid crystal screens are combined to form a single large screen when the electronic device is opened from a closed state. In addition, it is necessary to develop a hinge device of a type suitable for the same.

On the other hand, in such type of foldable display device, the display part may not be fully folded like a paper sheet but leave an arc-shaped curved portion having a predetermined radius. Thus, there is a need to minimize the arc-shaped curved portion to prevent a gap between both bodies of the foldable display device from being generated when the device is folded.

SUMMARY OF THE INVENTION

Accordingly, the present disclosure has been made keeping in mind the above problems occurring in the related art, and an objective of the present disclosure is to provide a hinge configured to allow a hinge structure to be located in an area where a flexible display is folded to correct a variable length deviation of the flexible display when folding or unfolding the flexible display, thereby preventing deformation and breakage of the display.

The objective of the present disclosure may be achieved by a foldable display device, including a first body and a second body formed in a plate shape to be arranged symmetrically; a display part attached to the first body and the second body to be folded or unfolded; and a hinge device coupled to the first body and the second body to connect the bodies to each other and allowing the first body and the second body to be folded and unfolded, wherein the hinge device includes a first bracket coupled to the first body and a second bracket coupled to the second body; first and second main shafts passing through one end of the first and second brackets and disposed in parallel respectively; a rotation inducing part fitted to outer surfaces of the first and second main shafts to guide linear motion when the first and second main shafts rotate; and a mobile part composed of first and second link connectors fitted to outer surfaces of the first and second main shafts and connected to the rotating induction unit, first and second links hinged to the first and second link connectors respectively, and first and second connection plates hinged to the first and second links and attached to the first and second bodies respectively, wherein when the first and second bodies are folded, the first and second connection plates are in proximity to each other, and the first and second link connectors move about the first and second main shafts to be in proximity to each other.

According to an embodiment, the device may further include first and second shaft pins fitted to the first and second tubular bodies respectively and first and second springs coupled to the first and second shaft pins respectively.

According to an embodiment, the device may further a first support plate supporting the first and second springs and coupled to the first and second shaft pins; a second support plate coupled in parallel with the first support plate and coupled to the first and second shaft pins; first and second gears interposed between the first and second support plates and coupled to the first and second shaft pins respectively; and multiple interlocking gears gear-engaged to the first and second gears.

According to the disclosed embodiment, it is possible to provide a hinge configured to allow a hinge structure to be located in an area where a flexible display is folded to correct a variable length deviation of the flexible display when folding or unfolding the flexible display, thereby preventing deformation and breakage of the display.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
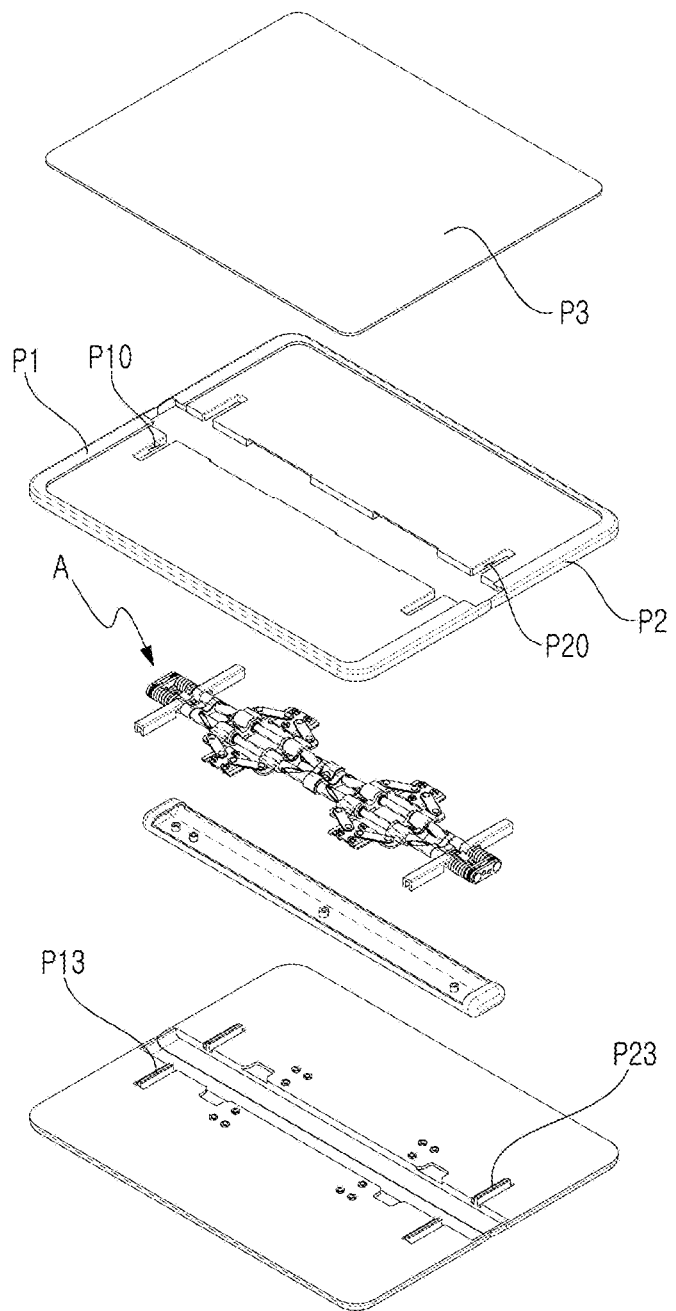
FIG. 1 is an exploded perspective view showing a foldable display device according to an embodiment.

Hereinafter, preferred embodiments will be described in detail with reference to the accompanying drawings.

The embodiments to be described below are intended to be described in detail to the extent that one of ordinary skill in the art to which the present invention pertains can easily implement the invention, and do not mean to limit the technical spirit and scope of the present invention.

In addition, the size or shape of the components shown in the drawings may be exaggerated for clarity and convenience of description, and terms specifically defined in consideration of the configuration and operation of the present invention may vary depending on the intentions or customs of user or operator. It should be noted that definitions of these terms should be made based on the contents throughout this specification.

Embodiment 1

Figure 2:
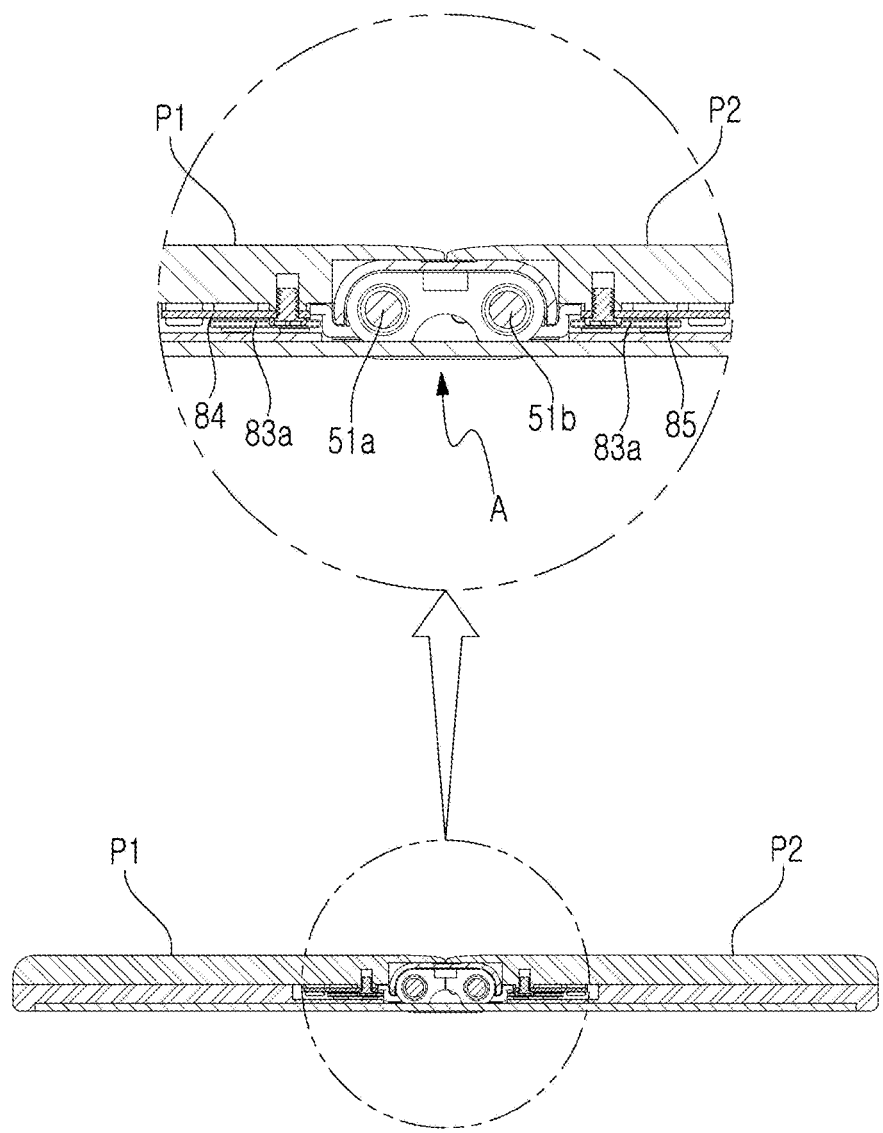
FIG. 2 is a cross-sectional view showing a state in which a foldable display device is unfolded according to the embodiment.
Figure 3:
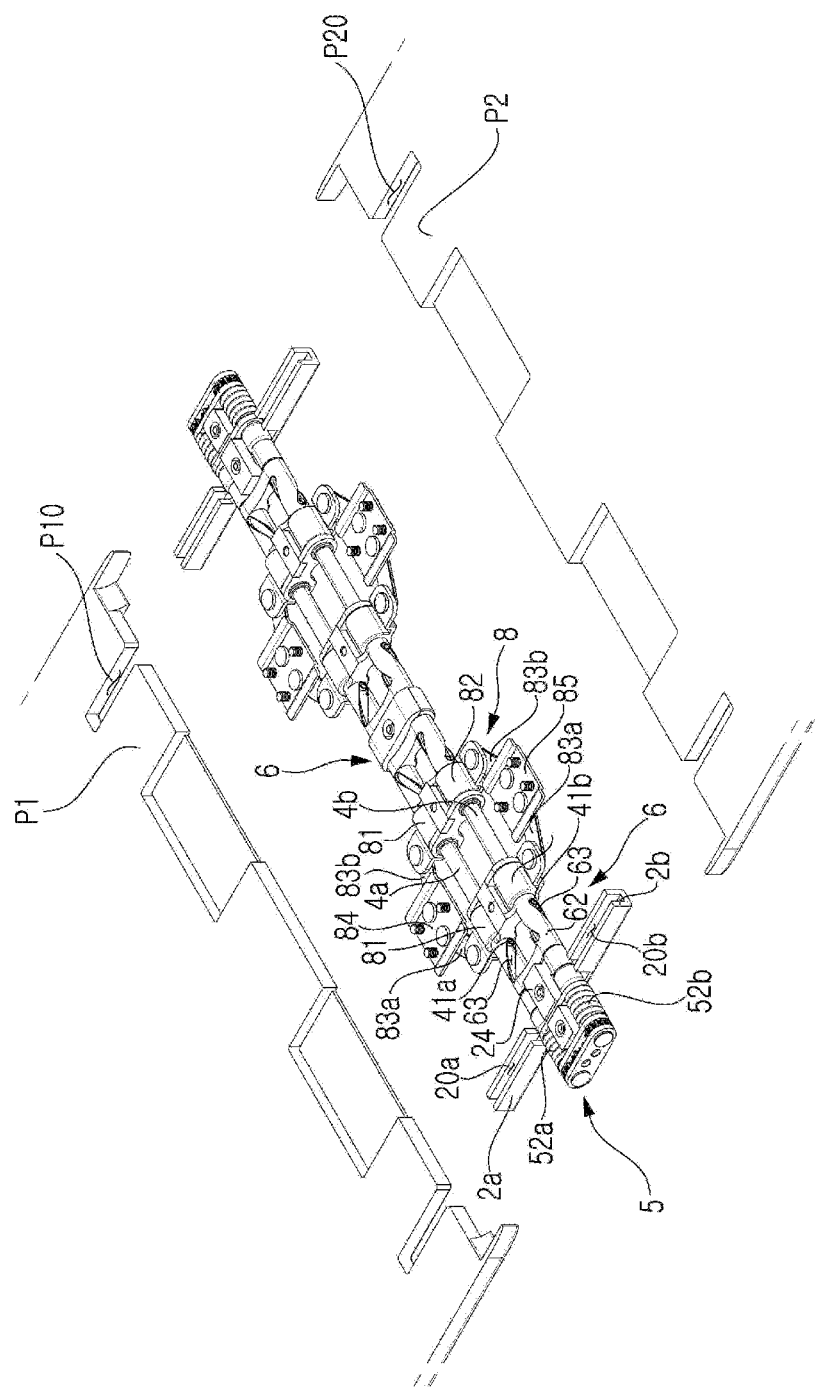
FIG. 3 is a perspective view showing a state in which a "hinge device" is unfolded in a foldable display device according to an embodiment.
Figure 4:
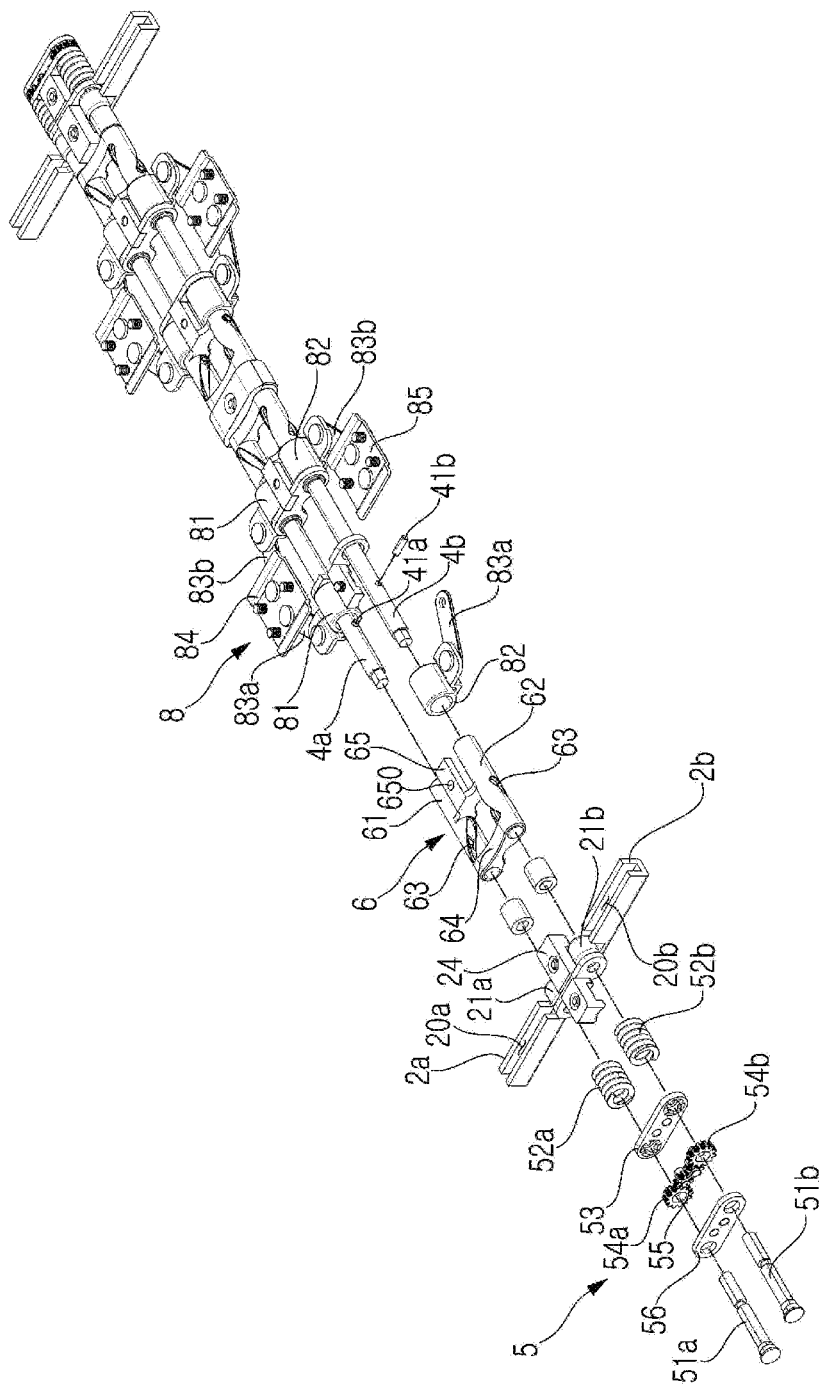
FIG. 4 is an exploded perspective view showing an enlarged portion in FIG. 3.
Figure 5:
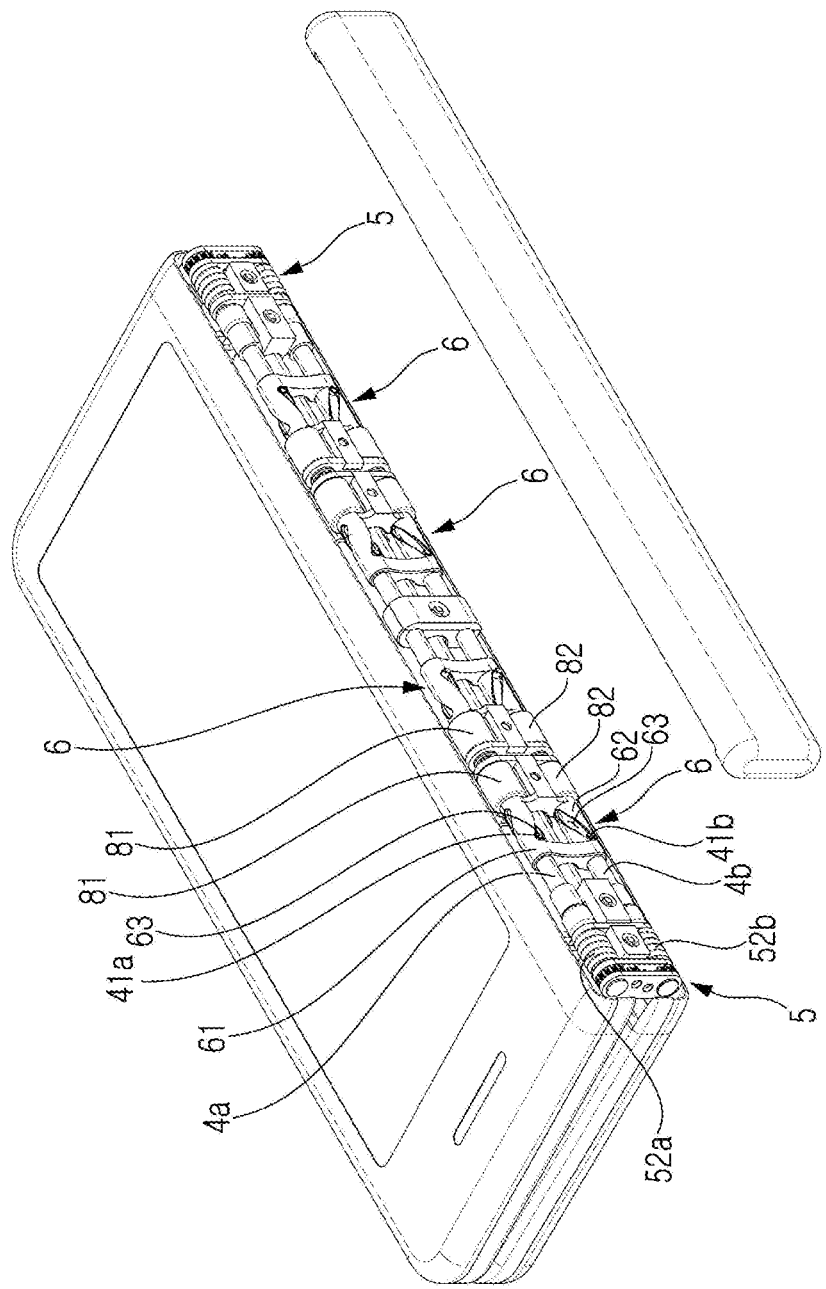
FIG. 5 is a perspective view showing a state in which a "hinge device" is folded in a foldable display device according to an embodiment.
Figure 6:
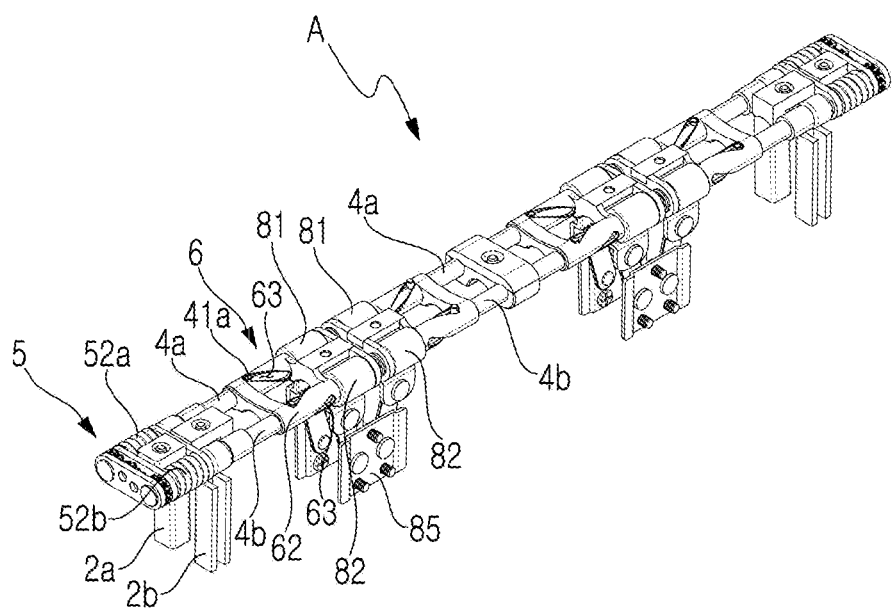
FIG. 6 is a perspective view showing the "hinge device" in FIG. 5.
Figure 7:
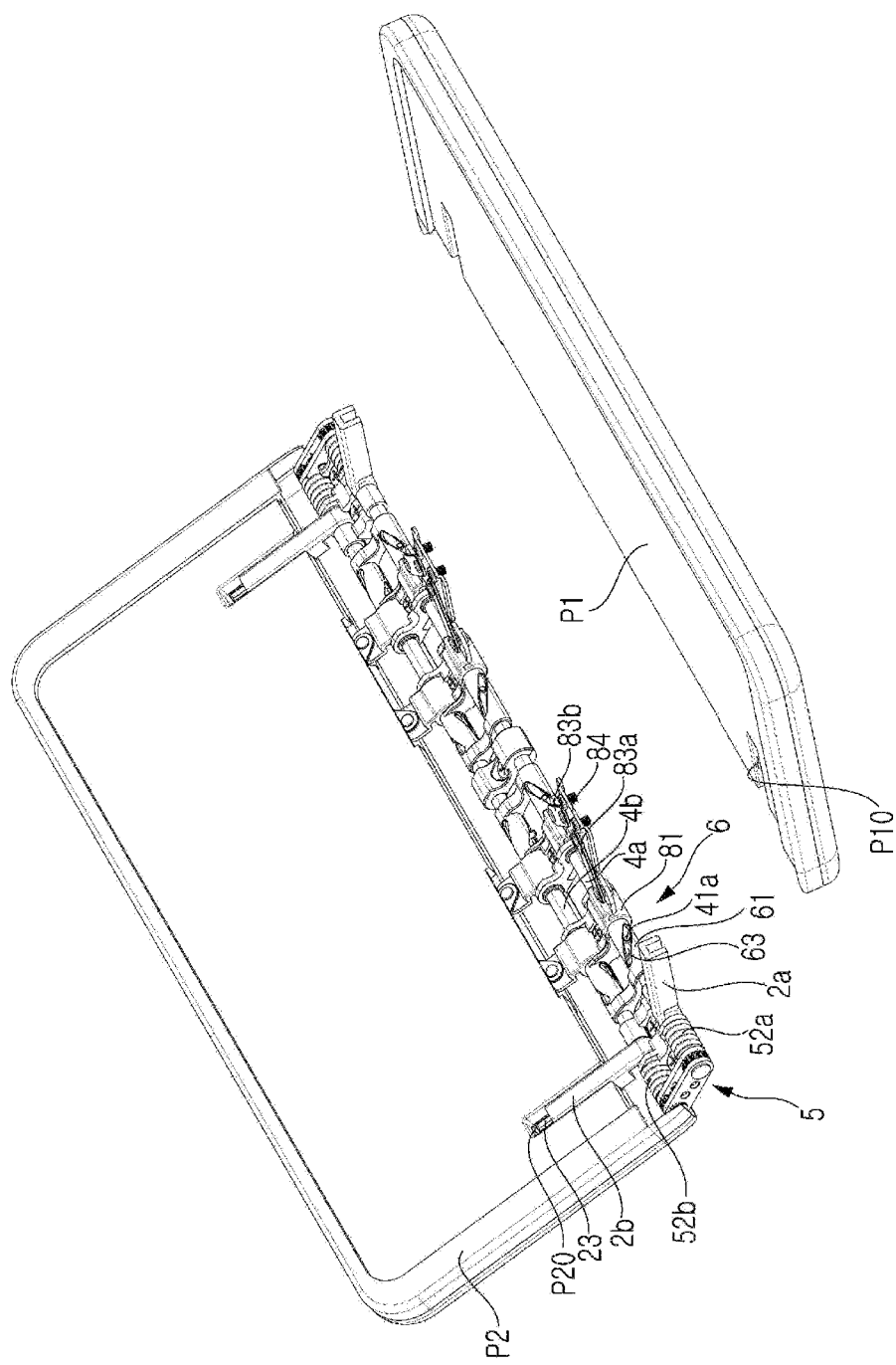
FIG. 7 is an enlarged perspective view showing a state in which a "hinge device" is half-unfolded in a foldable display device according to an embodiment.
Figure 8:
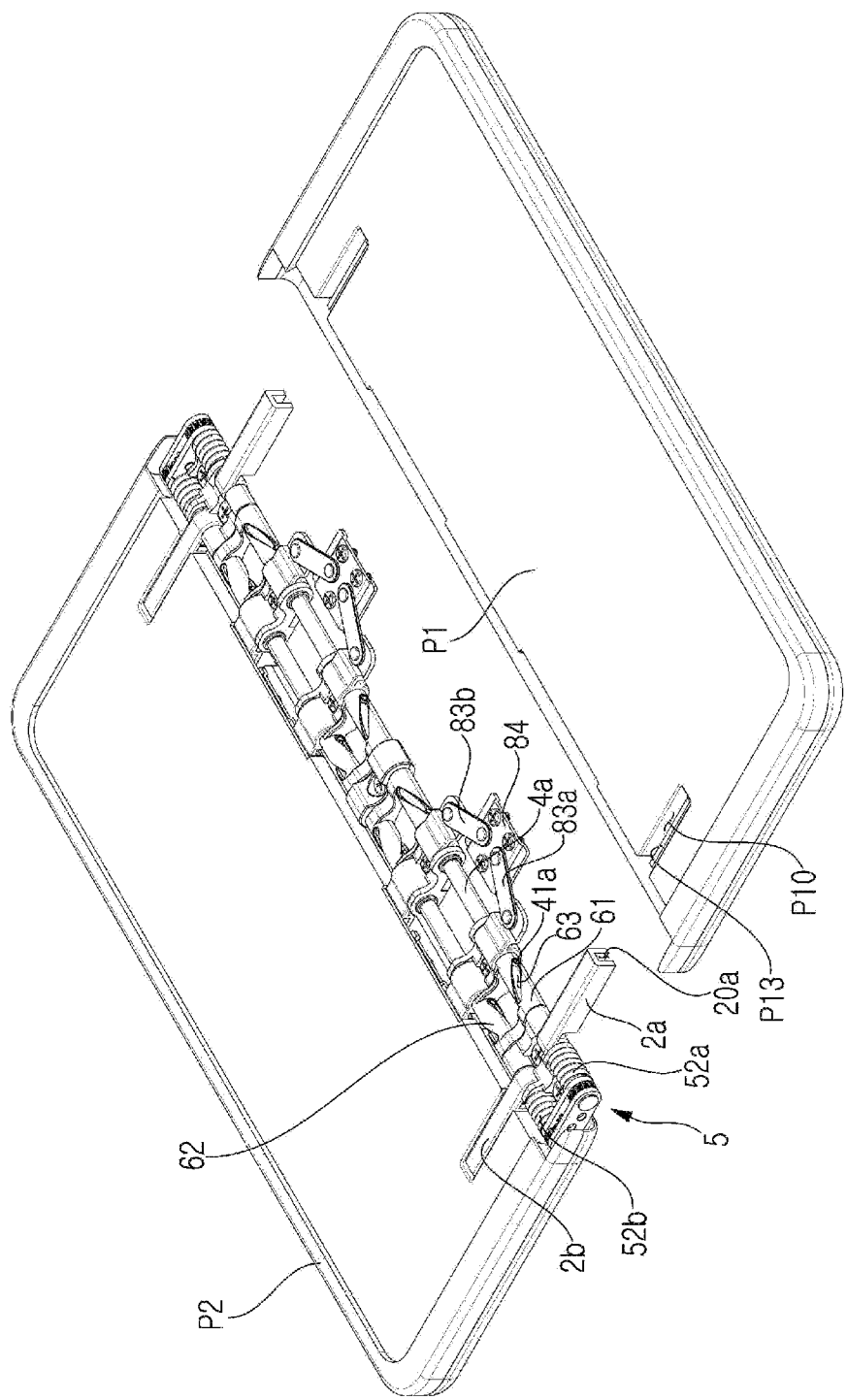
FIG. 8 is an enlarged perspective view showing a state in which a "hinge device" is horizontally unfolded in a foldable display device according to an embodiment.

Among the accompanying drawings, FIG. 1 is an exploded perspective view showing a foldable display device according to an embodiment; FIG. 2 is a cross-sectional view showing a state in which a foldable display device is unfolded according to the embodiment; FIG. 3 is a perspective view showing a state in which a "hinge device" is unfolded in a foldable display device according to an embodiment; FIG. 4 is an exploded perspective view showing an enlarged portion in FIG. 3; FIG. 5 is a perspective view showing a state in which a "hinge device" is folded in a foldable display device according to an embodiment; FIG. 6 is a perspective view showing the "hinge device" in FIG. 5; FIG. 7 is an enlarged perspective view showing a state in which a "hinge device" is half-unfolded in a foldable display device according to an embodiment; and FIG. 8 is an enlarged perspective view showing a state in which a "hinge device" is horizontally unfolded in a foldable display device according to an embodiment.

A foldable display device according to an embodiment of this disclosure is configured to include a first body P1 and a second body P2 formed in a plate of the same shape to be arranged symmetrically; an display part P3 attached to the first body P1 and the second body P2 to be folded or unfolded; and a hinge device A allowing the first body P1 and the second body P2 to be folded and unfolded.

The hinge device A is configured so that the first body P1 and the second body P2 are coupled to each other to be rotated within the range of an unfolded state lying on the same plane to a folded state overlapping each other.

The hinge device A includes:

a first bracket 2a coupled to the first body P1 and a second bracket 2b coupled to the second body P2;

first and second main shafts 4a and 4b disposed in parallel to pass through one end of each of the first and second brackets 2a and 2b;

a rotation inducing part 6 fitted to outer surfaces of the first and second main shafts 4a and 4b to guide linear motion when the first and second main shafts 4a and 4b are rotated; and a mobile part 8 composed of first and second link connectors 81 and 82 fitted to the outer surfaces of the first and second main shafts 4a and 4b and connected to the rotation inducing part 6, first and second links 83a and 83b hinged to the first and second link connectors 81 and 82 respectively, and first and second connection plates 84 and hinged to the first and second links 83a and 83b and attached to the first and second bodies P1 and P2 respectively; and when the first and second bodies P1 and P2 are folded, the first and second connection plates 84 and 85 are in proximity to each other, and the first and second link connectors 81 and 82 move about the first and second main shafts 4a and 4b to be in proximity to each other.

Each of the first body P1 and the second body P2 is made of a rectangular plate material having the same shape and size, and has an area corresponding to half the area of the display part P3.

The first body P1 and the second body P2 are formed with slide grooves P10 and P20 into which the first and second brackets 2a and 2b are slidably coupled, respectively.

Preferably, the slide grooves P10 and P20 is formed with slide protrusions P13 and P23, and the first and second brackets 2a and 2b are formed with rail grooves 20a and 20b to be fitted into the slide protrusions P13 and P23.

The first and second brackets 2a and 2b are formed with bosses 21a and 21b having through holes at one side, and rail grooves 20a and 20b having a predetermined length at the other side, respectively.

As shown in FIG. 4, the first and second main shafts 4a and 4b are rod-shaped with the same length and diameter to each other, and are formed to have the same length as the long sides of the first and second bodies P1 and P. The respective first and second main shafts 4a and 4b pass through the respective bosses 21a and 21b formed at one end of the respective first and second brackets 2a and 2b, have respective pins 41a and 41b protruding from outer circumferential surfaces thereof, and are arranged in parallel.

The rotation inducing part 6 is configured to include first and second tubular bodies 61 and 62 each fitted to outer surfaces of the first and second main shafts 4a and 4b, and having a guide groove 63 formed in a diagonal direction, a connecting rod 64 connected across one end of the first and second tubular bodies 61 and 62, and a bracket 65 connecting the middle portions of the first and second tubular bodies 61 and 62 and having a fastening hole 650.

The first and second shaft pins 41a and 41b protrude from the first and second main shafts 4a and 4b, respectively.

The first and second shaft pins 41a and 41b of the first and second main shafts 4a and 4b are coupled to the guide grooves 63 of each of the first and second tubular bodies 61 and 62, respectively, to guide the rotation of the first and second main shafts 4a and 4b.

Two guide grooves are diagonally formed for each of the first and second tubular bodies 61 and 62. Herein, two guide grooves are formed in opposite directions to each other, to be arranged in an approximately "X" shape.

The first and second shaft pins 41a and 41b are fitted into two guide grooves 63, respectively, so that the first and second shaft pins 41a and 41b move along the guide groove 63 when the main shaft 4a and 4b rotates.

The first and second shaft pins 41a and 41b accurately guide the rotational operation of the main shaft 4a and 4b while moving along the guide groove 63, to guide the rotation inducing part 6 to move in a straight line on the main shafts 4a and 4b.

When the rotation inducing part 6 moves linearly, the moving part 8 hinged to the link 83 is rotated horizontally, vertically, or at an inclined angle, between 0 degree and 90 degrees, due to the inclination angle of the guide groove 63, whereby an operation causing the first and second brackets 2a and 2b to be unfolded or folded or an operation causing the same to be unfolded in an inclined manner is caused.

The movable part 8 is configured to include a first link connector 81 fitted to outer surface of the first main shaft 4a and connected to the rotation inducing part 6, a second link connector 82 fitted to outer surface of the second main shaft 4b, first and second links 83a and 83b hinged to each of the first and second link connectors 81 and 82, and first and second connection plates 84 and 85 formed in the first and second links 83a and 83b and attached to the first body P1.

The connecting plates 84 and 85 are coupled to the first and second bodies P1 and P2, respectively. Each of the connecting plates 84 and 85 has the first and second links 83a and 83b connected at both sides thereof. The link 83 is hinged to the first and second link connectors 81 and 82 integrally coupled with the rotation inducing part 6, so that as the first and second links 83a and 83b at both sides rotate, the proximity or separation operation between the first and second link connectors 81 and 82 at both sides is performed.

The proximity operation between the first and second link connectors 81 and 82 at both sides is implemented when the first and second bodies P1 and P2 are folded, as shown in FIG. 6.

On the contrary, the separation operation between the first and second link connectors 81 and 82 is implemented when the first and second bodies P1 and P2 are unfolded, as illustrated in FIGS. 7 and 8.

Referring again to FIG. 4, each of the first and second brackets 2a and 2b are formed with bosses 21a and 21b at one end, and the first and second main shafts 4a and 4b are fitted into the bosses 21a and 21b, respectively.

A support 24 supporting the respective bosses 21a and 21b of the respective first and second brackets 2a and 2b is provided, and a flange 25 having a through hole which allows the first and second shaft pins 41a and 41b to pass through is formed at one side of the support 24.

As shown in FIGS. 5 and 6, when the first and second bodies P1 and P2 are folded to each other, the first and second connecting plates 84 and 85 are in close proximity, and the first and second link connectors 81 and 82 move about the first and second main shafts 4a and 4b to be in proximity to each other.

The first and second shaft pins 41a and 41b are fitted to the first and second tubular bodies 61 and 62 of the rotation inducing part 6, respectively.

Meanwhile, first and second springs 52a and 52b are coupled to the first and second shaft pins 41a and 41b, respectively.

The first and second springs 52a and 52b are in close contact with the flange 25 of the support 24 to which the first and second brackets 2a and 2b are coupled at one end thereof, respectively, and are supported in close contact with a first support plate 53 of a gear coupling part 5 at the other end.

The respective first and second shaft pins 41a and 41b penetrate through the flange 25 and are fitted to the respective tubular bodies 61 and 62 of the rotation inducing part 6.

The gear coupling part 5 serves to correct the rotation angles of the first main shaft 4a and the second main shaft 4b to be equal to each other.

Referring to FIG. 4, the gear coupling part 5 is configured to include a first support plate 53 supporting the first and second springs 52a and 52b and coupled to the first and second shaft pins 41a and 41b, a second support plate 56 coupled to the first support plate 53 in parallel and coupled to the first and second shaft pins 41a and 41b, first and second gears 54a and 54b interposed between the first and second support plates 53 and 56 and coupled to the first and second shaft pins 41a and 41b, respectively, and multiple interlocking gears 55 gear-engaged with the first and second gears 54a and 54b.

The first and second gears 54a and 54b are pinion gears having the same number of teeth.

The multiple interlocking gears 55 are pinion gears having a smaller number of teeth than the first and second gears 54a and 54b, and has an even number of teeth so that direction inversion is possible to allow the first and second gears 54a and 54b to be rotated in opposite directions to each other.

Hereinafter, the operation of the present invention will be described.

[Half-Folded State]

As shown in FIG. 7, the first and second bodies P1 and P2 are oriented at about 45 degrees to each other, and the first and second brackets 2a and 2b move in the slide grooves P10 and P20.

The first and second main shafts 4a and 4b rotate together, and the first and second shaft pins 41a and 41b are located at the middle portion of the guide groove 63.

In addition, the first and second gears 54a and 54b of the gear coupling part 5 may rotate 45 degrees and then are fixed in a state that maintains the rotation angle.

[Unfold State]

As shown in FIG. 8, the first and second bodies P1 and P2 are oriented at 180 degrees to each other, and the first and second brackets 2a and 2b move further in the slide grooves P10 and P20 to be in close contact with the end portions thereof.

The first and second main shafts 4a and 4b rotate together, and the first and second shaft pins 41a and 41b are located at the end portion of the guide groove 63.

In addition, the first and second gears 54a and 54b of the gear coupling part 5 rotate together 180 degrees and then are fixed in a state in which the rotation angle is maintained.

Embodiment 2

Figure 9:
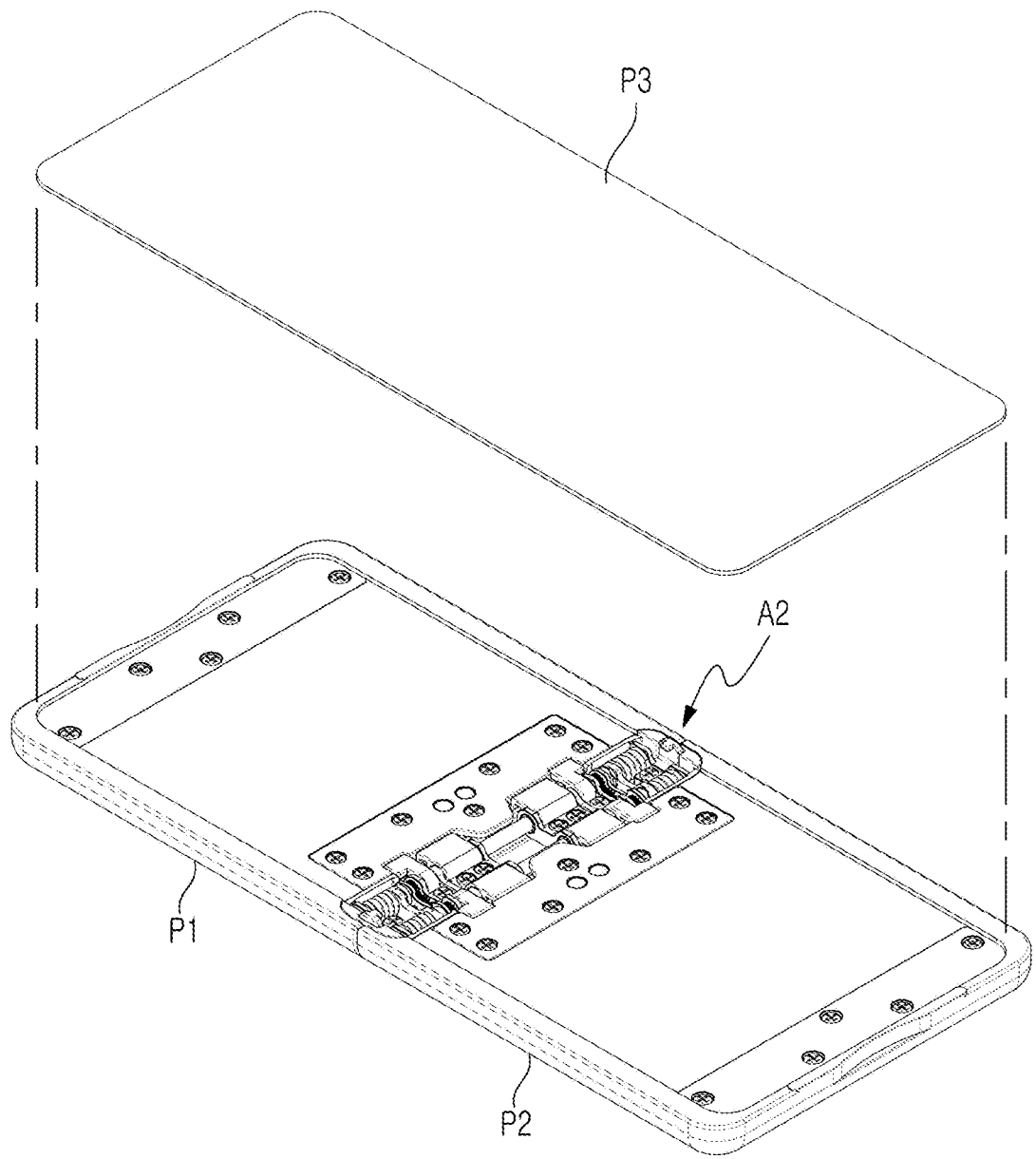
FIG. 9 is a perspective view showing a state in which a foldable display device is unfolded according to another embodiment.
Figure 10:
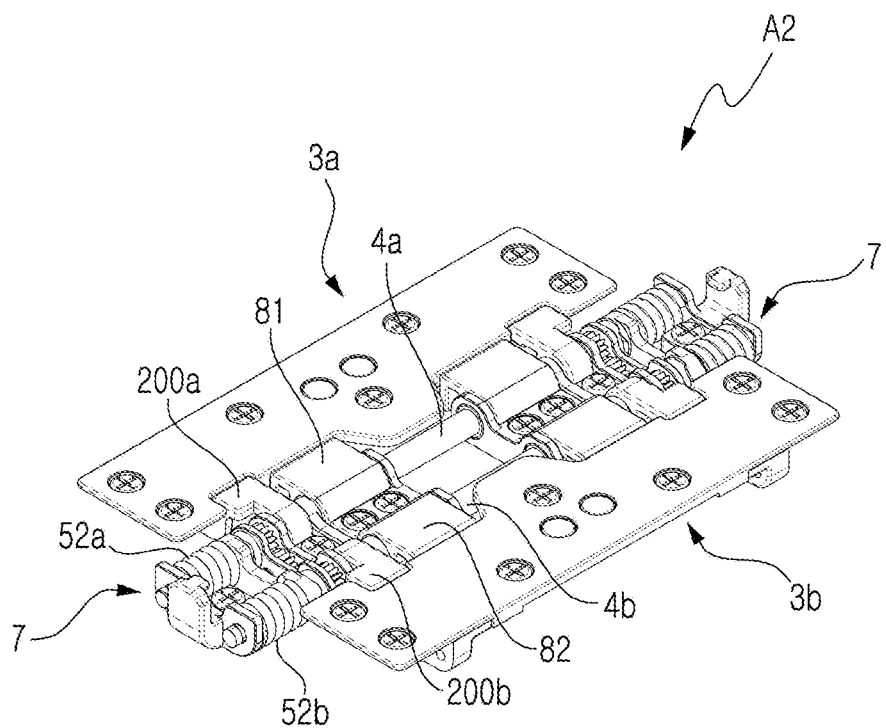
FIG. 10 is a perspective view showing a "hinge device" of a foldable display device as viewed from the top according to another embodiment.
Figure 11:
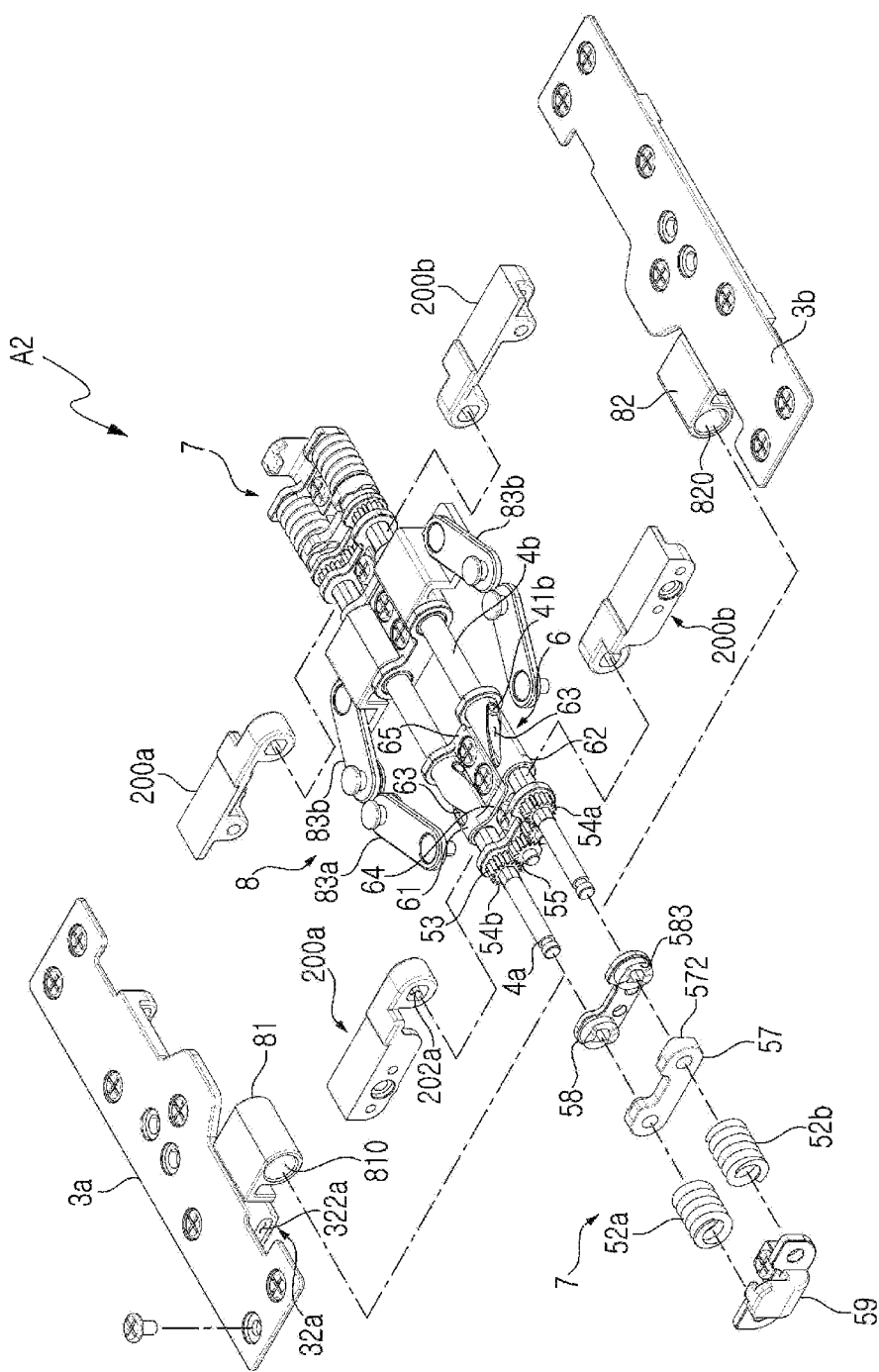
FIG. 11 is an exploded perspective view of FIG. 10.
Figure 12:
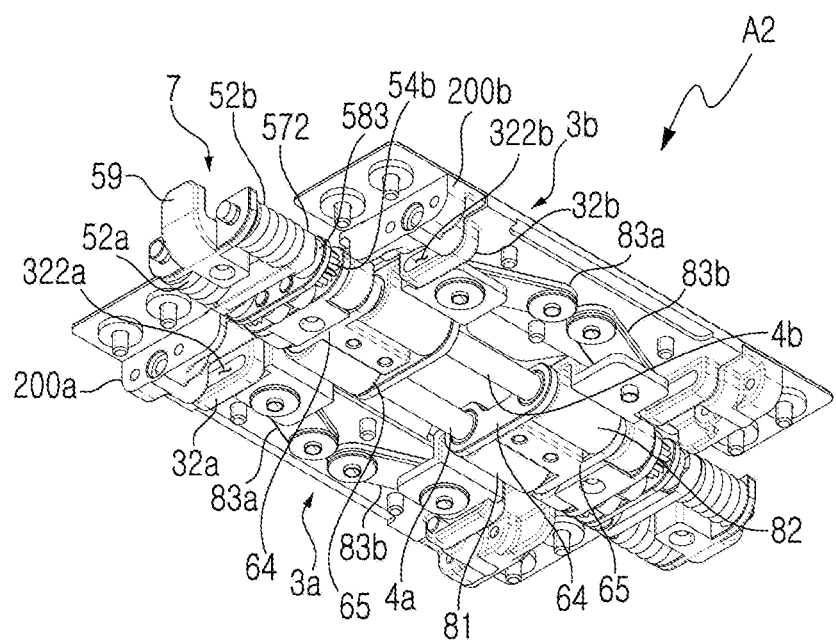
FIG. 12 is a perspective view showing a "hinge device" of a foldable display device as viewed from the bottom according to another embodiment.
Figure 13:
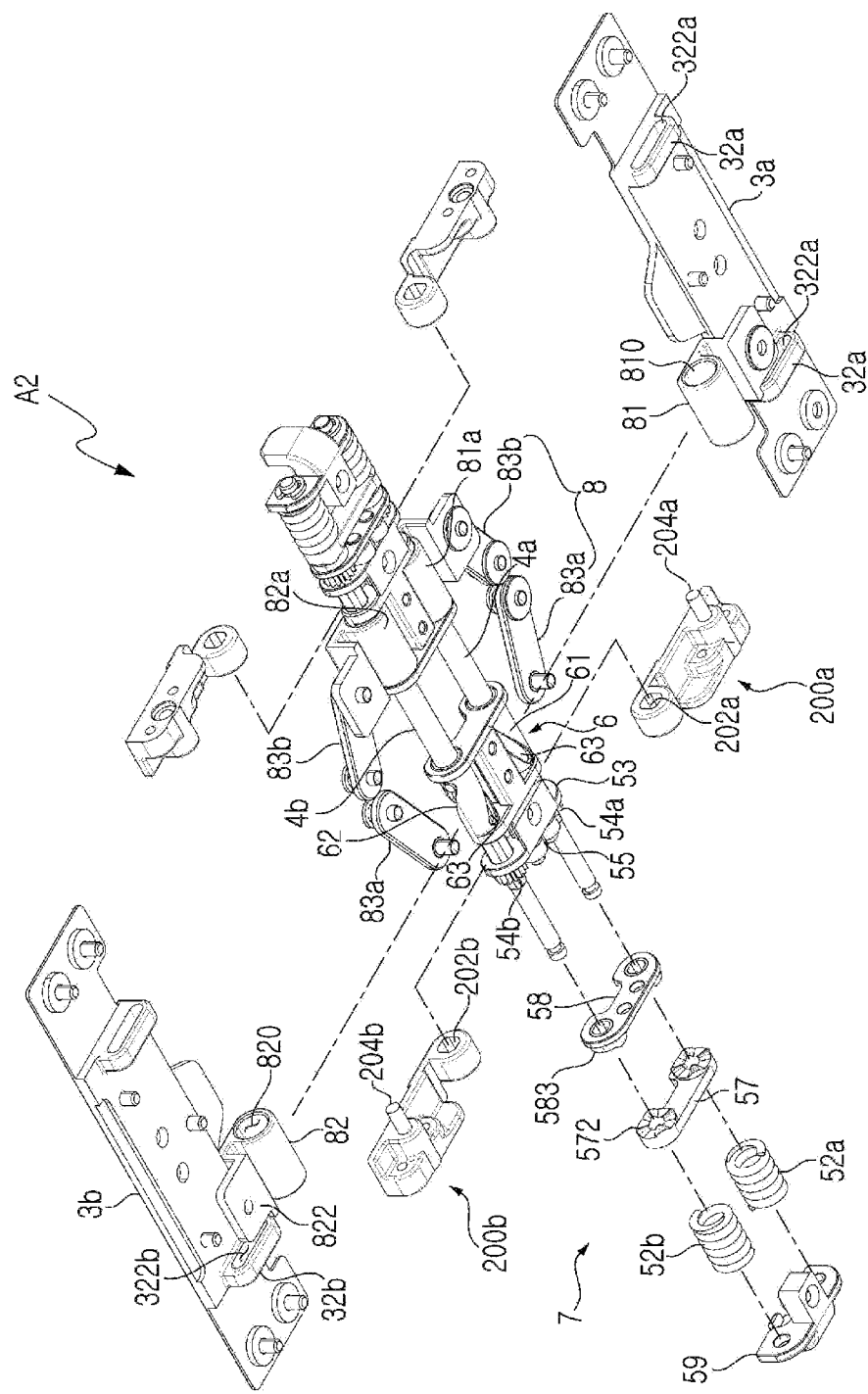
FIG. 13 is an exploded perspective view of FIG. 12.
Figure 14:
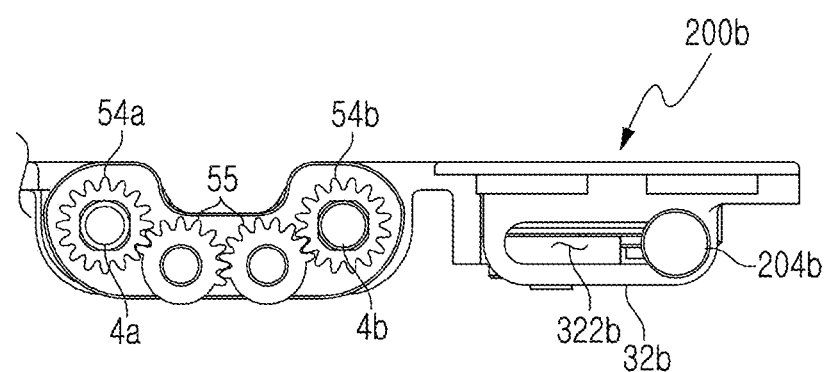
FIG. 14 is an enlarged front view showing a state in which a "hinge device" of a foldable display device is unfolded according to another embodiment.
Figure 15:
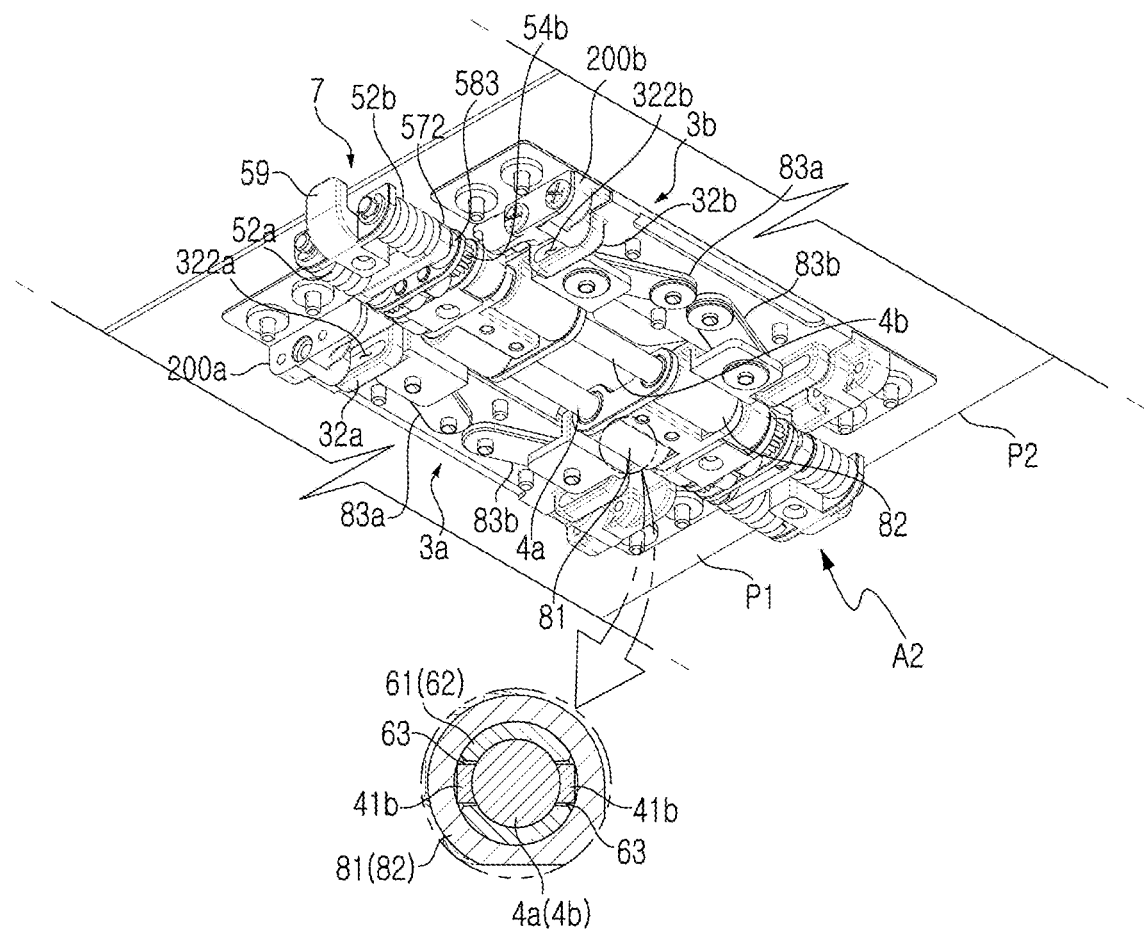
FIG. 15 is a perspective view showing a state in which a "hinge device" of a foldable display device is unfolded according to another embodiment.
Figure 16:
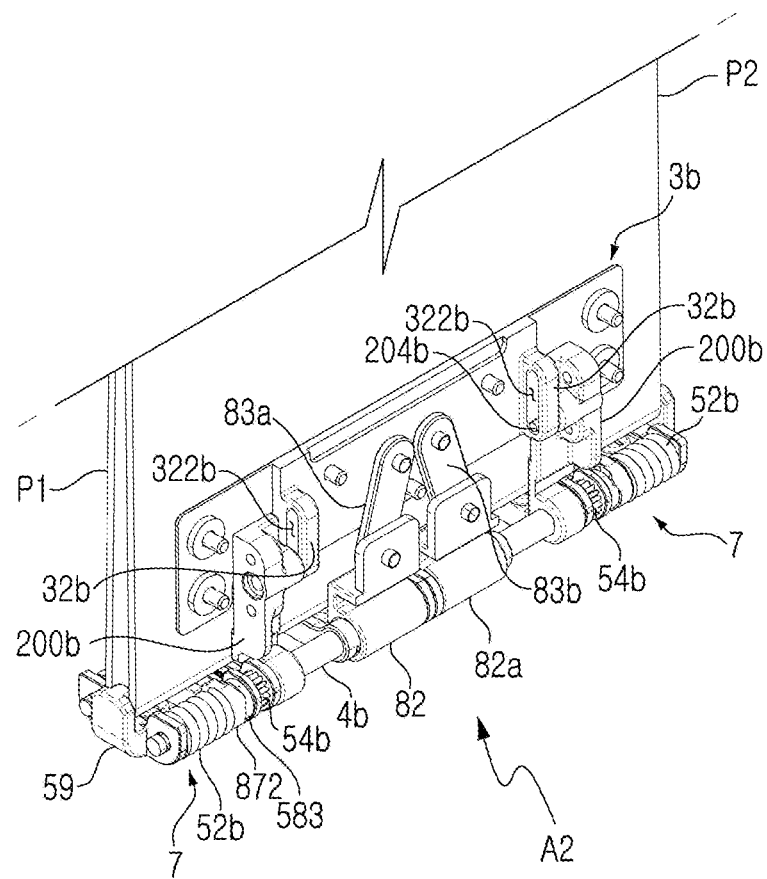
FIG. 16 is a perspective view showing a state in which a "hinge device" of a foldable display device is folded according to another embodiment.

Among the attached drawings, FIG. 9 is a perspective view showing a foldable display device according to another embodiment; FIG. 10 is a perspective view showing a "hinge device" of a foldable display device according to another embodiment, as viewed from the top; FIG. 11 is an exploded perspective view of FIG. 10; FIG. 12 is a perspective view showing a "hinge device" of a foldable display device according to another embodiment, as viewed from the bottom; FIG. 13 is an exploded perspective view of FIG. 12; FIG. 14 is an enlarged front view showing a state in which a "hinge device" of a foldable display device is unfolded according to another embodiment; FIG. 15 is a perspective view showing a state in which a "hinge device" of a foldable display device is unfolded according to another embodiment; and FIG. 16 is a perspective view showing a state in which a "hinge device" of a foldable display device is folded according to another embodiment.

A foldable display device according to another embodiment is configured to include:
first body P1 and second body P2 formed in a plate of the same shape and arranged symmetrically;
a display part P3 attached to the first body P1 and the second body P2 to be folded or unfolded; and
a hinge device A2 coupled to connect the first body P1 and the second body P2 to each other to allow the first body P1 and the second body P2 to be folded or unfolded.

The hinge device A2 is coupled to connect the first body P1 and the second body P2 with each other, to be rotated within the range of an unfolded state lying on the same plane to a folded state overlapping each other.

The hinge device A2 is roughly the same to the hinge device A in the embodiment 1, but is different in that the rotation inducing part 6 is coupled to the inside of the first and second link connectors 81 and 82 to enable free rotation.

The hinge device A2 is configured to include a first connection plate 3a coupled to the first body P1, and having a first link connector 81 having a coupling hole and a movement guide 32a attached to a first connection ring 200a having a coupling hole 202a and formed with a long hole 322a horizontally at the bottom thereof; a second connection plate 3b coupled to the second body P2, and having a second link connector 82 having a coupling hole and a movement guide 32b attached to a second connection ring 200b having a coupling hole 202b and formed with a long hole 322b horizontally at the bottom thereof; a first main shaft 4a coupled through the first link connector 81; a second main shaft 4b coupled through the second link connector 82 and disposed in parallel with the first main shaft 4a; a rotation inducing part 6 fitted to outer surfaces of the first and second main shafts 4a and 4b and fitted to inner surface of the first and second link connectors 81 and 82, to linearly move along with the first and second link connectors 81 and 82 about the first and second main shaft 4a and 4b when the first and second main shaft 4a and 4b rotate; and first and second links 83a and 83b hinged to the first and second link connectors 81 and 82 at one ends thereof and hinged to the first and second connection plates 3a and 3b at the other ends thereof, respectively.

When the first and second bodies P1 and P2 are folded, the first and second connection plates 84 and 85 are in proximity to each other, and the first and second link connectors 81 and 82 and the rotation inducing part 6 may move about the first and second main shafts 4a and 4b to be in proximity to each other.

The first and second main shafts 4a and 4b are rod-shaped with the same length and diameter to each other, and are formed to have the same length as the long sides of the first and second bodies P1 and P2. The first and second main shafts 4a and 4b are coupled through the bosses 21a and 21b formed at one end of the first and second brackets 2a and 2b and formed with pins 41a and 41b protruding from the outer circumferential surface thereof, respectively. The first and second main shafts are arranged in parallel.

The rotation inducing part 6 is inserted into the first and second link connectors 81 and 82. Preferably, the rotation inducing part 6 is fitted into the coupling holes 810 and 820 of the first and second link connectors 81 and 82.

As shown in FIGS. 11 and 15, the rotation inducing part 6 is configured to include first and second tubular bodies 61 and 62 fitted into the outer surfaces of the respective first and second main shafts 4a and 4b and having a guide groove 63 formed in a diagonal direction; and first and second shaft pins 41a and 41b protruding from the respective first and second main shafts 4a and 4b.

The first and second shaft pins 41*a* and 41*b* of the first and second main shafts 4*a* and 4*b* are coupled to the guide grooves 63 of the first and second tubular bodies 61 and 62 to guide the rotations of the first and second main shaft 4*a* and 4*b*, respectively.

Two guide grooves are diagonally formed for each of the first and second tubular bodies 61 and 62, in which two guide grooves are formed in opposite directions to be arranged in an approximately "X" shape.

Each of the first and second shaft pins 41*a* and 41*b* is fitted with two guide grooves 63 are fitted, so that when the main shafts 4*a* and 4*b* rotate, the first and second shaft pins 41*a* and 41*b* move along the inclination of the guide groove 63.

The first and second shaft pins 41*a* and 41*b* accurately guide the rotational operation of the main shaft 4*a* and 4*b* while moving along the guide groove 63, to guide the rotation inducing part 6 to move in a straight line on the main shafts 4*a* and 4*b*.

Since the rotation angle may be determined by the length of the guide groove 63, the rotation angle is preferably 90 degree, but may be changed by increasing or shortening the length of the guide groove 63 as necessary.

When the rotation inducing part 6 moves linearly on the main shafts 4*a* and 4*b*, the moving part 8 hinged to the link is rotated horizontally, vertically, or at an inclined angle, between 0 degree and 90 degrees, due to the inclination angle of the guide groove 63, whereby an operation causing the first and second brackets 2*a* and 2*b* to be unfolded or folded or an operation causing the same to be unfolded in an inclined manner is caused.

Referring to FIGS. 11 and 12, the movable part 8 includes a first link connector 81 fitted to the outer surface of the first main shaft 4*a* and connected to the rotation inducing part 6, a second link connector 82 fitted to the outer surface of the second main shaft 4*b*, and first and second links 83*a* and 83*b* hinged to the respective first and second link connectors 81 and 82.

The first and second links 83*a* and 83*b* are hinged to the first connection plate 3*a* or the second connection plate 3*b*, respectively.

The first and second connection plates 3*a* and 3*b* are coupled to the first and second bodies P1 and P2, respectively (see FIGS. 9 and 15).

The first and second connection plates 3*a* and 3*b* are connected to the first and second links 83*a* and 83*b* on the rear surfaces thereof and have first and second connection rings 200*a* and 200*b* mounted on one sides thereof, respectively (see FIG. 11).

The first and second links 83*a* and 83*b* are symmetrically arranged, and the first and second links 83*a* and 83*b* are hinged to the first and second link connectors 81 and 82 coupled to the rotation inducing part 6 at one ends thereof, and hinged to the bottom surfaces of the first and second connection plates 3*a* and 3*b* at the other ends thereof, respectively.

In the process of the folding operation of the first and second links 83*a* and 83*b* at both sides, the proximity or separation between the first and second link connectors 81 and 82 is performed, so that a folding operation may be performed.

The separation operation between the first and second link connectors 81 and 82 refers to a state in which the first and second bodies P1 and P2 are unfolded, as illustrated in FIGS. 12 and 15.

On the contrary, the proximity operation between the first and second link connectors 81 and 82 refers to a state that the first and second bodies P1 and P2 are folded, as shown in FIG. 16.

The first and second connection rings 200*a* and 200*b* will be described.

As shown in FIG. 13, the first connection ring 200*a* has a coupling hole 202*a* formed at one end thereof and a guide pin 204*a* formed at the other side thereof.

The first main shaft 4*a* is fitted into the coupling hole 202*a*, and the guide pin 204*a* is coupled into the long hole 322*a* of the movement guide 32*a*.

The second coupling hole 202*b* is formed with a second connection ring 200*b* at one end thereof and a guide pin 204*b* at the other side thereof. The second main shaft 4*b* is fitted into the coupling hole 202*b* and the guide pin 204*b* is coupled into the long hole 322*b* of the movement guide 32*b*.

As shown in FIG. 16, when the first and second bodies P1 and P2 are folded, the first and second connection plates 3*a* and 3*b* are proximate to each other, and the first and second link connectors 81 and 82 rotate and, at the same time, move about the first and second main shafts 4*a* and 4*b* to be in proximity to each other. Herein, the first and second main shafts 4*a* and 4*b* coupled to the first and second tubular bodies 61 and 62 of the rotation inducing part 6 coupled to the inside of the first and second link connectors 81 and 82 rotate, and at the same time, the first and second link connectors 81 and 82 move to be in proximity to each other.

Meanwhile, as illustrated in FIGS. 11 and 13, first and second springs 52*a* and 52*b* are coupled to the first and second shaft pins 41*b*, respectively.

Each of the first and second springs 52*a* and 52*b* are in close contact with the first cam plate 57 at one end thereof, and supported in close contact with the closing member 59 of the angle setting part 7 at the other end thereof.

The respective first and second shaft pins 41*a* and 41*b* pass through the support plate 53, the first cam plate 57, and the second cam plate 58 and then fitted to the respective first and second springs 52*a* and 52*b* and the closing member 59.

Meanwhile, the angle setting part 7 serves to correct the rotation angles of the first main shaft 4*a* or 4*b* and the second main shaft 4*a* or 4*b* so that the rotation angles are the same to each other.

As shown in FIGS. 13 and 14, the angle setting part 7 is configured to include a support plates 53 coupled to the first and second main shafts 4*a* and 4*b* at both sides thereof; first and second gears 54*a* and 54*b* connected to the first and second main shafts 4*a* and 4*b* respectively and being in close contact with the support plate 53, and multiple interlocking gears 55 gear-engaged with the first and second gears 54*a* and 54*b*; a first cam plate 57 coupled to the first and second main shafts 4*a* and 4*b* at both sides and having a first cam 572 formed on each of both sides; a second cam plate 58 coupled to the first and second main shafts 4*a* and 4*b* at both sides, having a second cam 583 on each of both sides, and coupled with the first cam plate 57; first and second springs 52*a* and 52*b* coupled to the first and second main shafts 4*a* and 4*b* respectively and supported by the first cam plate 57; and a closing member 59 coupled to the first and second main shafts 4*a* and 4*b* and supported by the first and second springs 52*a* and 52*b*, respectively.

The first cam 572 and the second cam 583 may be configured so that recesses and projections are alternatively formed to be fitted to each other. Since each recess and each projection are arc-shaped, they function to provide a temporary fixing force to each other to make it possible to maintain at a predetermined angle.

Therefore, as the number of recesses and projections increases or decreases, it is possible to simplify the setting angle according to types or to determine a plurality of setting angle types.

The first and second gears 54a and 54b are pinion gears having the same number of teeth.

The interlocking gears 55 are pinion gears having a smaller number of teeth than that of the first and second gears 54a and 54b, and several interlocking gears are connected so that the first and second gears 54a and 54b may be rotated in opposite directions, thereby enabling the direction inversion and slowing down the rotation speed.

Hereinafter, an operation of the present invention will be described.

[Unfolding Operation]

As shown in FIG. 15, the first and second bodies P1 and P2) are oriented at 180 degrees to each other, and the guide pins 204a and 204b of the first and second connection rings 200a and 200b are moved to one end of the long holes 322a and 322b of the movement guides 32a and 32b, respectively.

The first and second main shafts 4a and 4b rotate, and the first and second shaft pins 41a and 41b move to and positioned at the end portion of the guide groove 63, so that the rotation angle is set at 180 degrees.

In addition, the first and second gears 54a and 54b of the angle setting part 7 may rotate together 180 degrees and then be fixed in a state where the rotated angle is maintained.

[Folded State]

As shown in FIG. 16, when the first and second bodies P1 and P2 are folded in parallel, the guide pin 204a, 204b of the first and second connection rings 200a, 200b are moved to the other ends of the long holes 322a and 322b of the movement guides 32a and 32b, respectively.

The first and second brackets 2a and 2b move in the slide grooves P10 and P20.

The first and second main shafts 4a and 4b rotate together, and then the first and second shaft pins 41b are located at the middle portion of the guide groove 63.

In addition, the first and second gears 54a and 54b of the angle setting part 7 rotate together 90 degrees and then are fixed in a state where the rotated angle is maintained.

Figure 17:
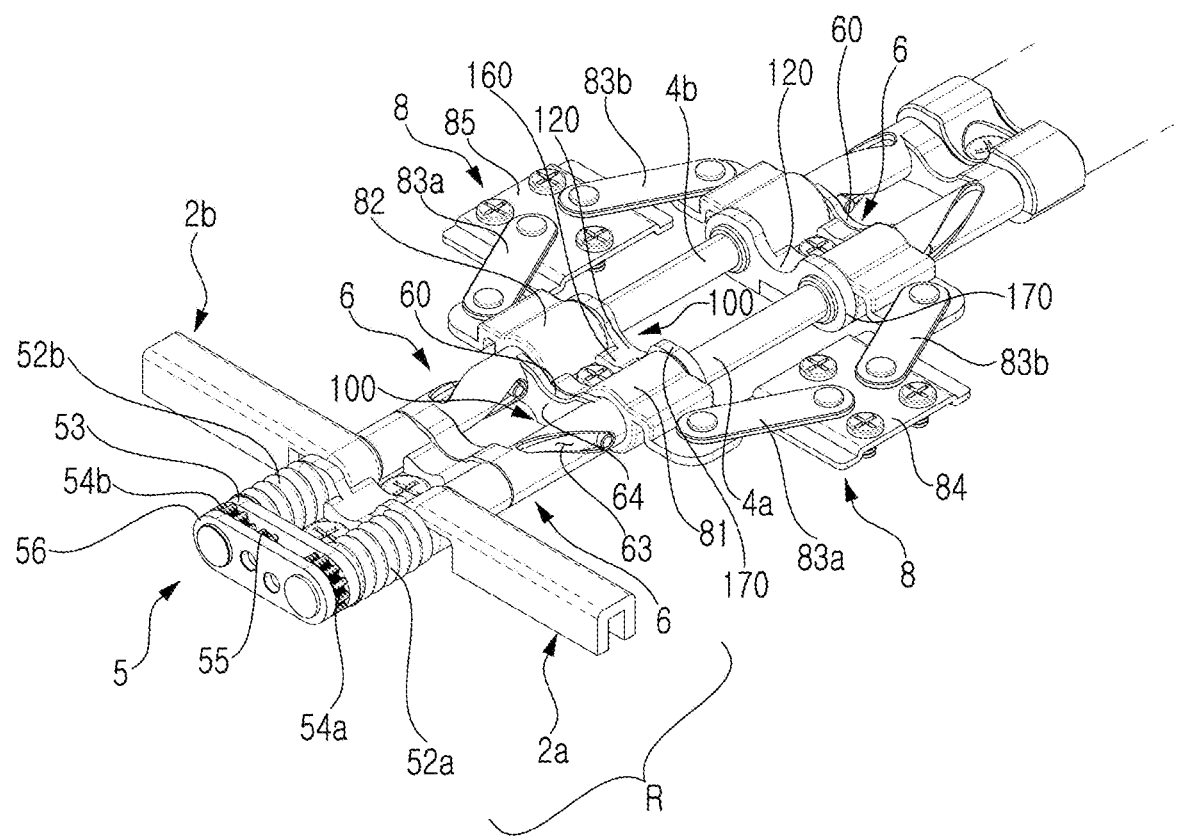
FIG. 17 is an enlarged perspective view showing a "hinge device" that accommodates a curved arc-shaped portion of the display part in a foldable display device according to an embodiment.
Figure 18:
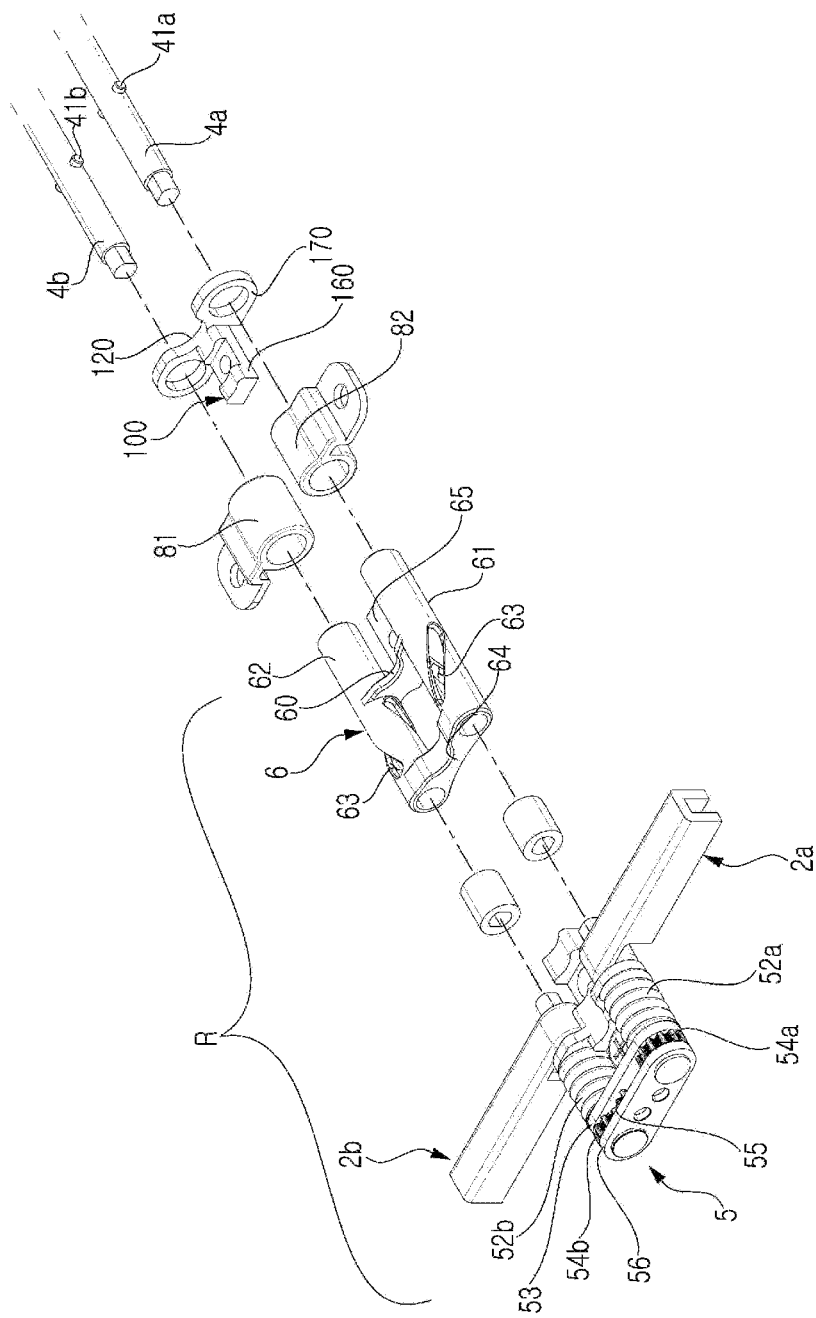
FIG. 18 is an exploded perspective view showing the "hinge device" of FIG. 17.
Figure 19:
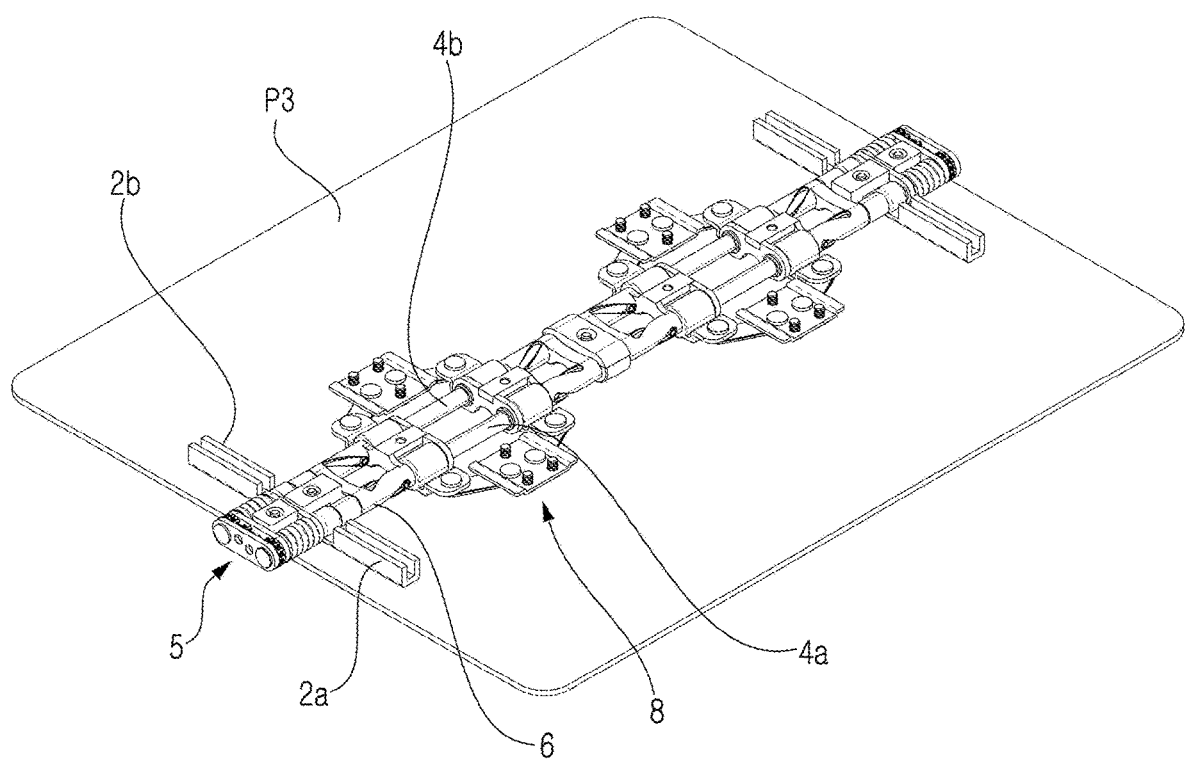
FIG. 19 is a rear perspective view showing a state in which a foldable display device is unfolded according to an embodiment.
Figure 20:
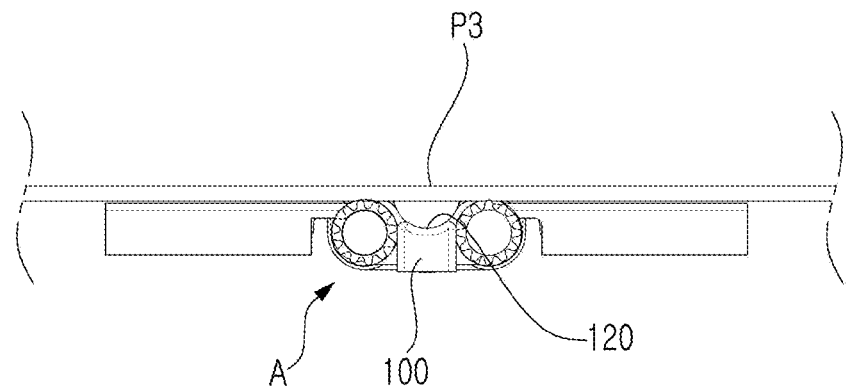
FIG. 20 is a front view of FIG. 19.
Figure 21:
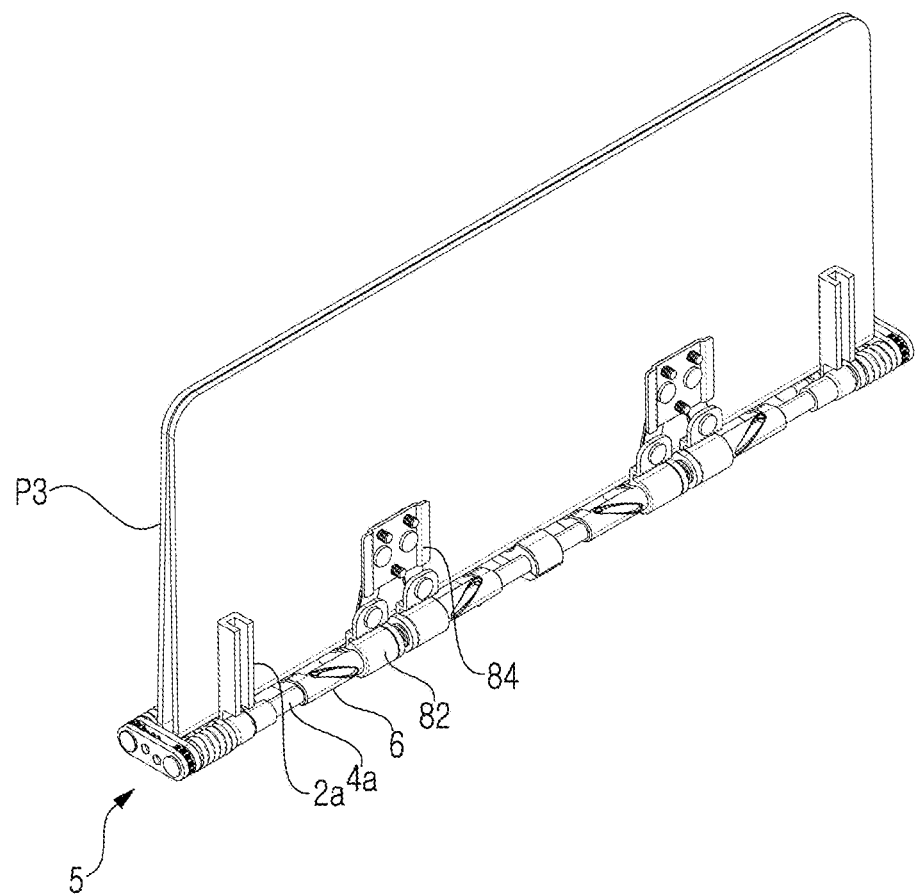
FIG. 21 is a perspective view showing a state in which a foldable display device is folded according to an embodiment.
Figure 22:
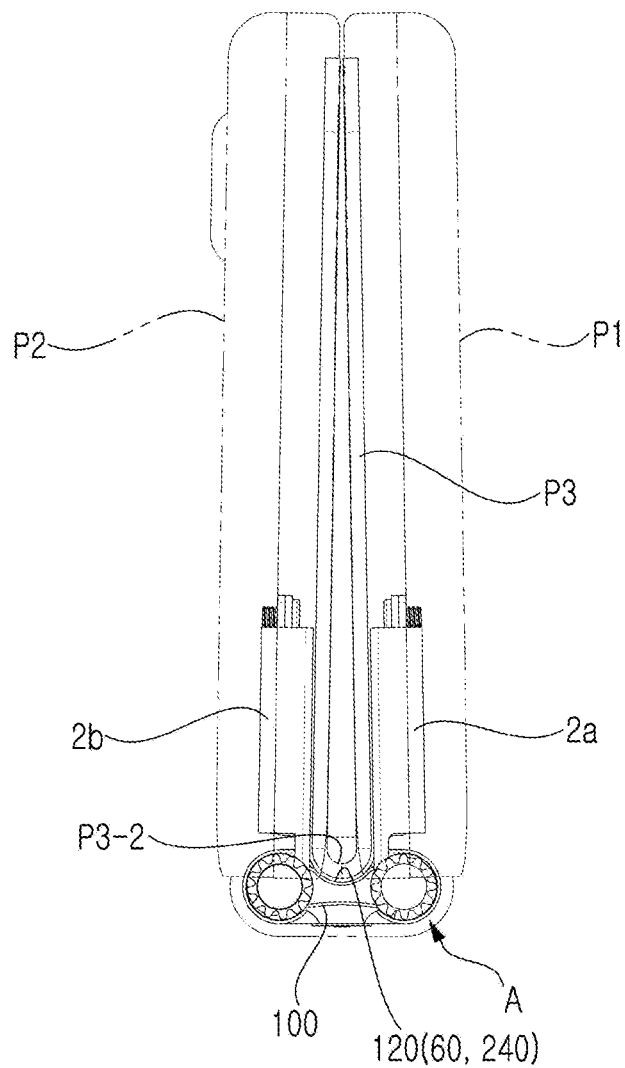
FIG. 22 is a front view of FIG. 21.

Meanwhile, FIG. 17 is an enlarged perspective view showing a "hinge device" that accommodates a curved arc-shaped portion of the display part in a foldable display device according to an embodiment; FIG. 18 is an exploded perspective view showing the "hinge device" of FIG. 17; FIG. 19 is a rear perspective view showing a state in which a foldable display device is unfolded according to an embodiment; FIG. 20 is a front view of FIG. 19; FIG. 21 is a perspective view showing a state in which a foldable display device is folded according to an embodiment; FIG. 22 is a front view of FIG. 21.

It is noted that a hinge device described below is applied to both of the embodiments 1 and 2 described above.

The hinge device is configured to include a rotating unit R coupled to each of the first and second bodies P1 and P2 to be rotated; and a connecting unit 100 connected to the rotating unit R and supporting the same to be maintained at a distance.

A concave accommodating portion 120 corresponding to the curved arc-shaped portion P3-2 of the display part P3 is formed in the connecting unit 100.

The accommodating portion 120 is concavely formed in a shape that is selected from among semicircular, square, and triangular shapes.

In addition, the accommodating portion 120 is also formed concavely on the top surface of the connecting rod 64 of the rotation inducing part 6 to be described later.

The rotating unit R is configured to include
a first bracket 2a coupled to the first body P1 and a second bracket 2b coupled to the second body P2;
first and second main shafts 2a and 2b coupled through one end of each of the first and second main shafts 4a and 4b arranged in parallel; and
a rotation inducing part 6 fitted into an outer surface of each of the first and second main shafts 4a and 4b, respectively to guide the linear motion when the first and second main shafts 4a and 4b are rotated.

In addition, the rotating unit R further includes a movable part 8 composed of respective first and second link connectors 81 and 82 fitted to the outer surfaces of the respective first and second main shafts 4a and 4b and connected to the rotation inducing part 6, and first and second links 83a and 83b hinged to each of the first and second link connectors 81 and 82, and respective first and second connection plates 84 and 85 hinged to the first and second links 83a and 83b and attached to the respective first and second bodies P1 and P2.

Therefore, when the first and second bodies P1 and P2 are folded (the first and second bodies P1 and P2 overlap each other), the first and second connection plates 84 and 85 may be in proximity to each other, and as well, the first and second link connectors 81 and 82 may move proximate to each other while moving about the first and second main shafts 4a and 4b (see FIGS. 21 and 22).

Each of the first body P1 and the second body P2 is made of a rectangular plate material having the same shape and size, and has an area corresponding to half the area of the display part P3.

The first body P1 and the second body P2 are formed with slide grooves P10 and P20 to which the first and second brackets 2a and 2b are slidably coupled, respectively.

Preferably, the slide grooves P10 and P20 is formed with slide protrusions P13 and P23, and the first and second brackets 2a and 2b are formed with rail grooves 20a and 20b to be fitted into the slide protrusions P13 and P23.

The first and second brackets 2a and 2b are formed with bosses 21a and 21b having through holes at one sides thereof, and rail grooves 20a and 20b having a predetermined length at the other sides thereof, respectively.

As shown in FIG. 18, the first and second main shafts 4a and 4b are rod-shaped with the same length and diameter to each other, and are formed to have the same length as the long sides of the first and second bodies P1 and P. The respective first and second main shafts 4a and 4b pass through the respective bosses 21a and 21b formed at one end of the respective first and second brackets 2a and 2b and have pins 41a and 41b formed to be protruded from the outer circumferential surfaces thereof, in which the first and second main shafts 4a and 4b are arranged in parallel.

Referring to FIG. 18, the rotation inducing part 6 is configured to include first and second tubular bodies 61 and 62 fitted to the outer surfaces of the respective first and second main shafts 4a and 4b and having the guide groove 63 formed in diagonal directions, a connecting rod 64 connected across one end of the first and second tubular bodies 61 and 62, and a bracket 65 connecting the middle portions of the first and second tubular bodies 61 and 62 and having a fastening hole 650.

In addition, as shown in FIG. 18, the connecting unit 100 includes a contact portion 160 coupled to overlap the bracket 65 of the rotation inducing part 6, and a both-side ring portion 170 formed at both sides of the contact portion 160 to allow the first and second main shafts 4a and 4b to pass therethrough, and the accommodating portion 120 is recessed concavely on the top surfaces of the both-side ring portion 170 and the contact portion 160.

The accommodating portion 120 is concavely formed in a shape that is selected from among semicircular, square, and triangular shapes.

In addition, the accommodating portion 120 is also formed concavely on the top surface of the connecting rod 64 of the rotation inducing part 6 to be described later.

First and second shaft pins 41a and 41b are protruded from the first and second main shafts 4a and 4b, respectively.

The first and second shaft pins 41a and 41b of the first and second main shafts 4a and 4b are coupled to the guide grooves 63 of the first and second tubular bodies 61 and 62, to guide the rotation of the first and second main shafts 4a and 4b, respectively.

The guide grooves 63 are configured so that two guide grooves are diagonally formed for each of the first and second tubular bodies 61 and 62, in which two guide grooves are formed in opposite directions to be arranged in an approximately "X" shape.

Each of the first and second shaft pins 41a and 41b is fitted with the two guide grooves 63, and when the main shaft 4a and 4b rotates, the first and second shaft pins 41a and 41b move along the inclination of the guide groove 63.

The first and second shaft pins 41a and 41b accurately guide the rotational operation of the main shaft 4a and 4b while moving along the guide groove 63, to allow the rotation inducing part 6 to move in a straight line on the main shafts 4a and 4b.

When the rotation inducing part 6 moves linearly, the moving part 8 hinged to the link 83 is rotated horizontally, vertically, or at an inclined angle, between 0 degree and 90 degrees, due to the inclination angle of the guide groove 63, which enables an operation causing the first and second brackets 2a and 2b to be unfolded or folded or an operation causing the same to be unfolded in an inclined manner.

The movable part 8 is configured to include a first link connector 81 fitted to outer surface of the first main shaft 4a and connected to the rotation inducing part 6, a second link connector 82 is fitted to outer surface of the second main shaft 4b, first and second links 83a and 83b respectively hinged to the first and second link connectors 81 and 82, and first and second connection plates 84 and 85 formed in the first and second links 83a and 83b and attached to the first body P1.

The connecting plates 84 and 85 are coupled to the first and second bodies P1 and P2, respectively. Each of the connecting plates 84 and 85 is connected to the first and second links 83a and 83b on both sides thereof, and the link 83 is hinged to the first and second link connectors 81 and 82 integrally coupled with the rotation inducing part 6. Therefore, as the first and second link 83a and 83b at both sides rotate, the proximity or separation operation between the first and second link connectors 81 and 82 on both sides is performed.

The proximity operation between the first and second link connectors 81 and 82 on both sides is implemented when the first and second bodies P1 and P2 are folded, as shown in FIG. 6.

On the contrary, the separation operation between the first and second link connectors 81 and 82 is implemented when the first and second bodies P1 and P2 are unfolded, as illustrated in FIGS. 19 and 20.

The first and second brackets 2a and 2b are coupled with first and second main shafts 4a and 4b at one end portions thereof, respectively.

As shown in FIGS. 21 and 22, when the first and second bodies P1 and P2 are folded, the first and second connection plates 84 and 85 are in proximity to each other, and the first and second link connectors 81 and 82 move about the first and second main shafts 4a and 4b to be in proximity to each other, respectively.

The first and second shaft pins 41a and 41b are fitted to the first and second tube bodies 61 and 62 of the rotation inducing part 6, respectively.

Meanwhile, as shown in FIG. 18, first and second springs 52a and 52b are coupled to the first and second main shafts 4a and 4b, respectively. That is, the first and second springs 52a and 52b are respectively coupled to the first and second main shafts 4a and 4b passing through the support 24, in which the first and second brackets 2a and 2b are coupled to one side of the support 24 and the first and second springs 52a and 52b are coupled to the other side of the support 24.

Preferably, the support 24 has an accommodating portion 240 formed on the top thereof. Therefore, an arc-shaped portion P3-2, which is formed when the display part is folded, may be inserted into the accommodating portion 240.

The first and second springs 52a and 52b are in close contact with the flange 25 at one end thereof and in close contact with the first support plate 53 of the gear coupling part 5 at the other end thereof, respectively, so that the coupling force between gears of the gear coupling part 5 may be increased, whereby a temporary fixing force may be achieved when adjusting the angle.

The gear coupling part 5 may allow the rotation angles of the first main shaft 4a and the second main shaft 4b to be maintained equal to each other.

The gear coupling part 5 is configured to include a first support plate 53 supporting the first and second springs 52a and 52b and coupled to the first and second main shafts 4a and 4b; a second support plate 56 coupled to the first support plate 53 in parallel and coupled to the first and second main shafts 4a and 4b; first and second gears 54a and 54b interposed between the first and second support plates 53 and 56 and coupled to the first and second main shafts 4a and 4b, respectively, and multiple interlocking gears 55 gear-engaged to the first and second gears 54a and 54b.

The first and second gears 54a and 54b are pinion gears having the same number of teeth.

The multiple interlocking gears 55 are pinion gears having a smaller number of teeth than the first and second gears 54a and 54b, and have an even number of teeth so that direction inversion is possible to allow the first and second gears 54a and 54b to be rotated in opposite directions to each other.

Hereinafter, the operation of the present invention will be described.

[Unfolding Operation]

This will be described with reference to FIGS. 19 and 20. FIG. 19 is a view showing the rear surface of the hinge device A in a state where the display part is located at the bottom.

As shown in FIGS. 19 and 20, when the first and second bodies P1 and P2 are oriented at 180 degrees to each other, the first and second bodies P1 and P2 move while sliding in a state that the first and second brackets 2a and 2b are coupled into the slide grooves P10 and P20, and the first and second brackets 2a and 2b rotate in opposite directions to each other and then are arranged horizontally.

In addition, the first and second main shafts 4a and 4b to which the first and second brackets 2a and 2b are coupled rotate together, and the first and second shaft pins 41a and 41b move within the guide grooves 63 of the first and second tubular bodies 61 and 62, and then are located approximately at end portions of the guide grooves 63.

In addition, the gear coupling part 5 may also be fixed in a state where the first and second gears 54a and 54b rotate and then maintain at a predetermined rotation angle (preferably 180 degrees).

[Folded State]

As shown in FIGS. 21 and 22, when the first and second bodies P1 and P2 rotate 90 degrees to be folded, the first and second bodies P1 and P2 move while sliding in a state that the first and second brackets 2a and 2b are coupled into the slide grooves P10 and P20, and the first and second brackets 2a and 2b rotate to be in opposite directions to each other, that is, a vertical state.

The first and second main shafts 4a and 4b to which the first and second brackets 2a are 2b are coupled rotate together, and the first and second shaft pins 41a and 41b move within the guide groove 63 of the first and second tube bodies 61 and 62 to be located approximately at the middle portion of the guide groove 63.

In addition, the gear coupling part 5 may be provided so that the first and second gears 54a and 54b rotate and then maintain at a predetermined rotation angle (preferably 90 degrees).

The display part P3 is formed with an arc-shaped portion P3-2 having a small radius when the middle portion thereof is folded, so that the arc-shaped portion P3-2 may be simultaneously inserted into the accommodating portion 120 of the connecting unit 100, the accommodating portion 60 of the connecting surface 64, and the accommodating portion 240 of the support 24, whereby the first and second bodies P1 and P2 may be in close contact to each other.

Although described in connection with the preferred embodiment, it is apparent that various modifications and variations can be readily recognized by those skilled in the art without departing from the spirit and scope of the invention, and all such changes and modifications are within the scope of the appended claims.

The invention claimed is:

1. A foldable display device, comprising:
a first body and a second body formed in a plate shape to be arranged symmetrically;
a display part attached to the first body and the second body to be folded or unfolded; and
a hinge device coupled to the first body and the second body to connect the bodies to each other and allowing the first body and the second body to be folded and unfolded,
wherein the hinge device includes:
a first bracket coupled to the first body and a second bracket coupled to the second body;
first and second main shafts passing through one end of the first and second brackets and disposed in parallel respectively;
a rotation inducing part fitted to outer surfaces of the first and second main shafts to guide linear motion when the first and second main shafts rotate; and
a mobile part composed of first and second link connectors fitted to outer surfaces of the first and second main shafts and connected to the rotating induction unit, first and second links hinged to the first and second link connectors respectively, and first and second connection plates hinged to the first and second links and attached to the first and second bodies respectively,
in which the first and second bodies are folded, the first and second connection plates are in proximity to each other, and the first and second link connectors move about the first and second main shafts to be in proximity to each other
wherein the rotation inducing part includes:
first and second tubular bodies fitted to outer surfaces of the first and second main shafts and having guide grooves formed in a diagonal direction respectively;
first and second shaft pins formed on the first and second main shafts respectively;
a connecting rod connected across one end portions of the first and second tubular bodies; and
an additional bracket connecting middle parts of the first and second tubular bodies and having a fastening hole,
wherein the first and second shaft pins are coupled to the guide grooves of the first and second tubular bodies, respectively,
wherein the foldable display device further comprising:
first and second springs coupled to the first and second shaft pins respectively; and
a support to which the first and second brackets are coupled;
wherein each of the first and second springs are supported in close contact with the support at one end thereof, and in close contact with a gear coupling part at the other end thereof,
wherein the gear coupling part includes:
a first support plate supporting the first and second springs and coupled to the first and second shaft pins;
a second support plate coupled in parallel with the first support plate and coupled to the first and second shaft pins;
first and second gears interposed between the first and second support plates and coupled to the first and second shaft pins respectively; and
multiple interlocking gears gear-engaged to the first and second gears,
wherein each of the first and second bodies is formed with a slide groove into which each of the first and second bracket is slidably coupled;
a slide protrusion is formed in the slide groove; and
each of the first and second brackets is formed with a rail groove into which the slide protrusion is fitted.

2. The device of claim 1, wherein the hinge device is provided so that the rotation inducing part is coupled to the inside of the first and second link connectors to be freely rotated.

3. The device of claim 1, wherein the first and second connection plates have first and second links connected at both sides thereof and are equipped with first connection ring and second connection ring, respectively, and
the first and second links are hinged to the first and second link connectors and hinged to the first and second connection plates, respectively.

4. The device of claim 3, wherein the first connection ring is formed with a coupling hole into which the first main shaft is fitted, and formed with a guide pin coupled to a long hole of the movement guide; and
the second connection ring is formed with a coupling hole into which the second main shaft is fitted, and formed with a guide pin coupled to a long hole of the movement guide.

5. The device of claim 1, wherein the rotation inducing part is formed with an accommodating portion on a top surface of the connecting rod, so that a recessed arc-shaped portion of the display part is inserted into the accommodating portion.

6. The device of claim 3, further comprising:
a support to which the first and second main shafts are coupled and by which first and second springs are supported, wherein the support is formed with an accommodating portion on a top portion thereof so that an arc-shaped portion is inserted when the display part is folded.

* * * * *